(12) United States Patent
Clowes et al.

(10) Patent No.: US 9,300,105 B2
(45) Date of Patent: Mar. 29, 2016

(54) METHODS AND APPARATUS PERTAINING TO PICOSECOND PULSED FIBER BASED LASERS

(71) Applicant: Fianium Inc., Eugene, OR (US)

(72) Inventors: John Redvers Clowes, New Milton (GB); Paulo Almeida, Southampton (GB); Anatoly Borisovich Grudinin, Southampton (GB); Pascal Dupriez, Leognan (FR); Christophe Codemard, Eastleigh (GB)

(73) Assignee: Fianium Ltd., Southhampton (GB)

( * ) Notice: Subject to any disclaimer, the term of this patent is extended or adjusted under 35 U.S.C. 154(b) by 0 days.

(21) Appl. No.: 14/186,763

(22) Filed: Feb. 21, 2014

(65) Prior Publication Data

US 2014/0168755 A1 Jun. 19, 2014

Related U.S. Application Data

(63) Continuation of application No. PCT/US2012/052176, filed on Aug. 24, 2012.

(60) Provisional application No. 61/644,424, filed on May 8, 2012, provisional application No. 61/527,042, filed on Sep. 14, 2011.

(51) Int. Cl.
*H01S 3/00* (2006.01)
*H01S 3/067* (2006.01)
(Continued)

(52) U.S. Cl.
CPC ............. *H01S 3/005* (2013.01); *B23K 26/0624* (2013.01); *B23K 26/36* (2013.01);
(Continued)

(58) Field of Classification Search
CPC ... H01S 3/005; H01S 3/06754; H01S 3/0057; B23K 26/0624
See application file for complete search history.

(56) References Cited

U.S. PATENT DOCUMENTS

| 4,750,809 A | 6/1988 | Kafka |
| 5,400,350 A | 3/1995 | Galvanauskas |

(Continued)

FOREIGN PATENT DOCUMENTS

| EP | 2086074 A2 | 8/2009 |
| WO | WO2004104676 A2 | 12/2004 |

(Continued)

OTHER PUBLICATIONS

KangKang Chen, Polarisation maintaining 100W Yb-fiber MOPA producing uJ pulses tunable in duration from 1 to 21 ps, Optics Express, vol. 18, No. 14.

(Continued)

*Primary Examiner* — Eric Bolda
(74) *Attorney, Agent, or Firm* — Peter Rainville

(57) ABSTRACT

A pulsed fiber laser apparatus for outputting picosecond laser pulses can comprise a fiber delivered pulsed seed laser for providing picosecond optical seed pulses, and at least one optical fiber amplifier in optical communication with the fiber delivered pulsed seed laser. The optical fiber amplifier can comprise a gain optical fiber that receives and optically amplifies picosecond optical pulses by operating in a nonlinear regime wherein the picosecond optical pulses can be spectrally broadened by a factor of at least 8 during amplification thereof. The apparatus can further comprise a pulse compressor apparatus in optical communication with the optical fiber amplifier for providing compressed picosecond optical pulses. The pulse compressor apparatus can provide a dispersion of at least 50 ps/nm and can provide a compression ratio of the time duration of the picoseconds optical pulses received by the pulse compressor apparatus to the time duration of the compressed picosecond optical pulses of no greater than about 50.

24 Claims, 14 Drawing Sheets

(51) Int. Cl.
*H01S 3/23* (2006.01)
*B23K 26/36* (2014.01)
*H01S 3/08* (2006.01)
*B23K 26/062* (2014.01)
*H01S 3/094* (2006.01)
*H01S 3/0941* (2006.01)
*H01S 3/16* (2006.01)
*H01S 3/11* (2006.01)

(52) U.S. Cl.
CPC .............. *H01S 3/0057* (2013.01); *H01S 3/067* (2013.01); *H01S 3/08013* (2013.01); *H01S 3/0078* (2013.01); *H01S 3/06725* (2013.01); *H01S 3/06745* (2013.01); *H01S 3/06754* (2013.01); *H01S 3/09415* (2013.01); *H01S 3/094007* (2013.01); *H01S 3/094011* (2013.01); *H01S 3/1118* (2013.01); *H01S 3/1618* (2013.01); *H01S 3/2308* (2013.01)

(56) References Cited

U.S. PATENT DOCUMENTS

| | | | |
|---|---|---|---|
| 5,499,134 | A | 3/1996 | Galvanauskas et al. |
| 5,656,186 | A | 8/1997 | Mourou et al. |
| 6,885,683 | B1 | 4/2005 | Fermann |
| 7,125,632 | B2 | 10/2006 | Volodin et al. |
| 7,330,301 | B2 | 2/2008 | Harter |
| 7,348,516 | B2 | 3/2008 | Sun et al. |
| 7,430,226 | B2 | 9/2008 | Liu |
| 7,444,049 | B1 | 10/2008 | Kim et al. |
| 7,477,666 | B2 | 1/2009 | Liu |
| 7,486,436 | B1 | 2/2009 | Kuksebkov et al. |
| 7,492,508 | B2 * | 2/2009 | Galvanauskas et al. ... 359/341.1 |
| 7,528,385 | B2 | 5/2009 | Volodin et al. |
| 7,551,809 | B2 | 6/2009 | Taita et al. |
| 7,590,162 | B2 | 9/2009 | Volodin et al. |
| 7,817,683 | B2 | 10/2010 | Khitrov |
| 8,379,298 | B2 * | 2/2013 | Clowes et al. ........... 359/341.32 |
| 2002/0164135 | A1 | 11/2002 | Tadakuma et al. |
| 2003/0072532 | A1 * | 4/2003 | Giannone et al. ............... 385/37 |
| 2003/0156605 | A1 | 8/2003 | Richardson et al. |
| 2004/0240037 | A1 | 12/2004 | Harter |
| 2005/0163426 | A1 | 7/2005 | Fermann et al. |
| 2005/0238066 | A1 | 10/2005 | Liu |
| 2006/0120418 | A1 | 6/2006 | Harter et al. |
| 2006/0171018 | A1 * | 8/2006 | Galvanauskas et al. ...... 359/333 |
| 2007/0177640 | A1 * | 8/2007 | Liu ................... 372/25 |
| 2007/0177643 | A1 | 8/2007 | Liu |
| 2008/0080570 | A1 | 4/2008 | Murison et al. |
| 2009/0002808 | A1 | 1/2009 | Wise et al. |
| 2009/0107962 | A1 * | 4/2009 | Munroe et al. ........... 219/121.67 |
| 2009/0128892 | A1 | 5/2009 | Wise et al. |
| 2009/0213880 | A1 | 8/2009 | Ouchi et al. |
| 2009/0273828 | A1 | 11/2009 | Waarts et al. |
| 2009/0323735 | A1 * | 12/2009 | Kuksenkov et al. .............. 372/6 |
| 2009/0323740 | A1 | 12/2009 | Stadler et al. |
| 2010/0247047 | A1 | 9/2010 | Filippov |
| 2011/0002691 | A1 | 1/2011 | Lin |
| 2011/0007760 | A1 | 1/2011 | Clowes et al. |

FOREIGN PATENT DOCUMENTS

| | | |
|---|---|---|
| WO | WO2005022705 A2 | 3/2005 |
| WO | WO2005094275 A2 | 10/2005 |
| WO | WO2010075999 A1 | 7/2010 |

OTHER PUBLICATIONS

Galvanauskas, Use of volume chirped Bragg gratings for compact high-energy chirped pulse amplification circuits, CLEO'98 p. 362.
J.P. Heritage, Spectral windowing of frequency-modulated optical pulses in a grating compressor, Appl. Phys. Lett. 47 (2), Jul. 15, 1985.
W. Hodel, Chirped pulse amplification in Er-doped fibers, Optics Communication 97 (1993) 233-238.
J.D. Kafka, Compression of pulses from a continuous-wave mode-locked Nd: YAG laser, Optics Letter, vol. 9, No. 11.
M.D. Perry, Spectral shaping in chirped-pulse amplification, Optics Letter, vol. 15, No. 7.
Diamian N. Schimpf, Controlling the influence of SPM in fiber-based chirped-pulse amplification systems by using an actively shaped parabolic spectrum, Optics Express, vol. 15, No. 25.
E. Seise, Peak-power scaling induced by spectral clipping in nonlinear CPA-systems, Lasers and Electro-Optics 2009 and the European Quantum Electronics Conference, 978-1-4244-4080-1.
Michelle L., Chirped pulse amplification in an erbium-doped fiber oscillator/erbium-doped fiber amplifier systems, Optics Communication 106 (1994) 249-252.
Kenji Taira, Subpicosecond Pulse Generation Using an Electroabsorption Modulator and a Double-Stage Pulse Compressor, IEEE Photonics Technology Letters, vol. 15, No. 9.
Yang et al., A Stable Ultrashort Pulse Generator Based on EAM and Well-Designed Compressor for Applications in 160 Gbit/s OTDM Networks, 2006 Chinese Phys. Lett. 23 2465.
P.J. Almeida, Ultrafast Fiber Lasers and Nonlinear Generation of Light, Transparent Optical Networks, 2009. ICTON '09. 11th International Conference on.
Stuart D. Brorson, Geometrical Limitations in Grating Pair Pulse Compression, Applied Optics, vol. 27, No. 1.
T. Damm, Compression of picosecond pulses from a solid-state laser using self-phase modulation in graded-index fibers, Optics Letters, vol. 10, No. 4.
E. M. Dianov, Efficient Compression of High-Energy Laser Pulses, Journal of Quantum Electronics, vol. 25, No. 4.
S. L. Palfrey, Generation of 16-fesc frequency-tunable pulses by optical pulse compression, Optics Letters, vol. 10, No. 11.
B. Valk, 3ps compressed pulses from a modelocked Kr+ laser, Appl. Phys. Lett. 50, 656 (1987).
D. F. Voss, Simultaneous amplification and compression of continous-wave mode-locked Nd:YAG laser pulses, Optics Letter, vol. 11, No. 4.
B. Zysset, 200-femtosecond pulses at 1.06um generated with a double stage pulse compressor, Optics Letters, vol. 11, No. 3.
Jay W. Dawson, High Energy, Short Pulse Fiber Injection Lasers at Lawrence Livermore National Laboratory, IEEE Journal of Selected Topics in Quantum Electronics.
J. Dawson, Comparison of amplified spontaneous emission pulse cleaners for use in chirped pulse amplification front end laser, Ultrafast Optics 2007.
G. Mourou, Generation of Stable Ps, mJ Pulses at High Repetition rate for Ultrafast Diagnostic Experiments, Lawrence Livermore National Laboratory, Technical Report, Oct. 1986.
J. P. Sokoloff, Pulse Compression of 100 Picosecond Pulses at 1.319 Microns, Lawrence Livermore National Laboratory, Final Technical Report, Dec. 1990.
G. Stegeman, Nonlinear Fiber Optics, Center for Research in Electro-Optics and Lasers, Final Technical Report, Dec. 1992.
International Search Report for PCT/US2012/052176 issued on Nov. 6, 2012.
International Preliminary Report on Patentability for PCT/US2012/052176 issued on Oct. 14, 2012.
Extended European search report issued for EP 12832126.2 by European Patent Office on May 19, 2015.
Amendment in response to the communication under Rule 161(2) and 162 EPC dated Apr. 24, 2014.

* cited by examiner

METHODS AND APPARATUS PERTAINING TO PICOSECOND PULSED FIBER BASED LASERS

CROSS-REFERENCE TO RELATED APPLICATIONS

The present application is continuation of International Patent Application No. PCT/US2012/052176, bearing an International Filing Date of 24 Aug. 2012, which in turn claims priority to U.S. Provisional Patent Application No. 61/527,042, accorded a filing date of 14 Sep. 2011, and to U.S. Provisional Patent Application No. 61/644,424, accorded a filing date of 8 May 2012. Each of the foregoing applications is incorporated by reference herein.

FIELD OF THE DISCLOSURE

The present disclosure relates to picosecond pulsed lasers, such as, for example, picosecond pulsed lasers that use optical fiber, as well as systems and methods for making and using such lasers.

BACKGROUND OF THE DISCLOSURE

Lasers based on optical fiber, whether in whole or in part, can provide more flexible, rugged and relatively simple sources of optical energy. For example, an optical fiber laser can have a smaller footprint, or can be more efficient, or can require less sophisticated cooling arrangements as compared to, for example, a gas based laser, particularly where gain media, whether amplifiers or oscillators, use fiber as the gain medium. Considerable technical effort and development has been focused on the production and use of nanosecond ("ns") and femtosecond ("fs") and laser pulses for materials processing, and particularly on fiber lasers for producing such pulses for materials processing.

Q-switched lasers, and in particular Q-switched fiber lasers, readily produce ns pulses with technology that is becoming relatively well understood and that can be relatively inexpensively manufactured so as to be reliable and dependable, even in a harsh production environment. However, the pulses can be longer than desired, and result in more energy than necessary being delivered to a work piece, which can cause an undesirable "heat affected zone" (HAZ) and damage.

Fs pulses can feature high peak power and a short time duration that can facilitate removing, such as by ablation, a material without creating as much, or any, HAZ that can damage the material. Fs pulses, however, can be considerably more difficult to produce and can require considerably more complex technology. For example, amplifying such fs pulses directly can induce undesirable nonlinear effects, particularly in a fiber amplifier where the peak power is high due to the short time duration of the pulse and where the optical intensity, which triggers the nonlinear effects, is also high due to the relatively small cross sectional area of the typical optical fiber. Certain nonlinear effects, such as Stimulated Brillouin Scattering (SBS) or Stimulated Raman Scattering (SRS), simply prevent providing higher output powers at the desired wavelengths. Accordingly, fs fiber lasers often use Chirped Pulse Amplification (CPA) to avoid triggering nonlinear effects such as SBS and SRS. In a typical CPA system a fs seed pulse is stretched via a pulse stretcher that provides linear chirp, and then the stretched, linearly chirped pulse, which has lowered peak power and optical intensity, is linearly amplified and then compressed using a linearly chirped pulse compressor to a fs pulse having high peak power. The compressed pulse can be substantially transform limited. The CPA technique works well, but its implementation can be technically complex and typically uses bulky, free space components (e.g., a bulk grating pair stretcher as well as a similar compressor). A fs CPA system can be large (several times larger than a ns system) as well as costly (e.g., more than 10 times the price of a ns system). Though less prevalent than CPA systems, it is also known to produce fs output pulses starting from picoseconds (e.g., 10 ps) seed pulses that are directly generated from a mode locked fiber laser and subsequently amplified by a fiber amplifier that adds spectrum via self phase modulation while producing an amplified pulse of nJ or greater pulse energy. A low spectral dispersion diffraction grating pair compressor (e.g., 0.5 ps/nm-1 ps/nm) compresses the amplified pulses to about 300 fs.

Picosecond ("ps") pulsed laser systems are also known, and can provide for certain materials processing an attractive compromise between the too long ns pulses and the short, but often complicated to produce, fs pulses. Ps pulses can be directly produced by a ps seed oscillator, which can be a fiber laser, and amplified directly by fiber laser amplifiers to provide ps output pulses without resorting to a complicated CPA stretcher—compressor arrangement. This simplicity can be seen as a desirable feature in comparison to fs systems, and helps reduce the size, price or complexity of a ps laser system as opposed to a fs laser system.

Temporally shaped pulses can also be of interest, particularly in the case of ns pulses, where having too high a pulse power for too long can create heating issues, as indicated above. Temporally shaping ns pulses often involves control circuitry controlling an external modulator, which adds cost and complexity to the system.

Applicants, however, have found that there can be drawbacks associated with the direct production of ps output pulses, particularly when using lasers using optical fiber. Applicants are also aware that shaped ps pulses can be of interest and that drawbacks associated with certain methods of producing shaped pulses should be minimized or avoided. Accordingly, it is an object of the present disclosure to provide improved methods and apparatus for making and using ps pulses.

Other objects will be apparent from a study of the remainder of the present disclosure, including the drawings and claims.

SUMMARY OF THE DISCLOSURE

The present disclosure teaches, in certain practices, methods and apparatus pertaining to a pulsed fiber laser that uses a relatively high spectral dispersion for compression in combination with a relatively low compression ratio. Systems known in the art, such as conventional fs CPA architectures, teach that an opposite approach is advantageous, namely, relatively low spectral dispersion and relatively high compression ratio. Furthermore, in the ps regime, a ps pulse can often simply be directly produced, such as by fiber delivered pulsed seed laser (FDPSL), or other seed laser, and amplified by a fiber amplifier or fiber amplifier cascade, that can include LMA fibers for reducing optical intensity and hence SPM and its attendant spectral broadening, without the use of one or more of stretching, compression, significant spectral broadening, etc. LMA fibers can have a V-number greater than 2.405 at the wavelength of operation (and hence be multi-mode), which results in ever lower intensity for the fundamental mode. However, Applicants have found that the methods and apparatus taught herein, which can be more complex than some of the prior art teachings and which run counter to conventional wisdom, can have advantages.

For example, following the above more conventional approach can result in a ps pulsed fiber laser wherein the output power degrades over time, particularly in the instance of higher output power (e.g., higher peak power) pulsed fiber lasers. This phenomenon is not well understood, and may involve photodarkening in one or more gain fibers, which itself can be a complex phenomenon whose dynamics are different in different regimes (i.e., continuous wave operation, ns pulse operation, ps pulse operation, fs operation, etc.). Applicants have found that a ps pulsed fiber laser as taught in embodiments herein can reduce a drop in output power over time, even when the gain fiber has higher intensity, such as by being single mode. The single mode fiber need not necessarily comprise an LMA fiber, and can have a smaller core diameter and/or a higher NA. If LMA fiber is used, cores can have smaller diameters and/or higher NAs. The use of single mode fiber, including single mode LMA fiber (or less multimode LMA fiber) can improve beam quality (usually specified in terms of the $M^2$ parameter of an output beam) or reduce or avoid the need for techniques such as coiling fiber to selectively introduce higher bend loss for higher order modes in multimode gain fibers, such as multimode LMA gain fibers. A pulsed fiber laser of the invention can include non-linear amplification prior to compression, where the nonlinear amplification results in spectral broadening. The spectral broadening can be useful in compressing the pulse.

Also taught herein are methods and apparatus concerning the generation and use of pulses, such as ps pulses, having a temporal power profile having a base pulse portion and a surge pulse portion. Such pulses can, in some practices of the disclosure, be generated at least in whole or in part via what according to the prior art would be considered a "flawed" compression process (e.g., incomplete compensation during compression of non-linear chirp), as it produces "flawed" pulses—pulse that not "clean" (e.g., are not transform or very near transformed limited). Nevertheless, according to some practices of the disclosure, such "flawed" production process and pulses, particularly in the case of ps pulses, are considered to be of beneficial use, such as, for example, in materials processes. Pulses having surge and base pulse portion can be generated via "incomplete" compression, such as due to non-compensated non-linear chirp generated, which can be generated via nonlinear amplification, or via other processes, such as, for example, diving a pulse into portions, applying different amounts of spectral dispersion to the portion prior to recombination into an output path.

Method and apparatus pertaining to pulse conditioning, which can produce pulses having base and surge pulse portions, are also taught herein and are described in more detail below.

More particularity, in one aspect, the present disclosure teaches a pulsed fiber laser apparatus for outputting optical pulses, such as picosecond (ps) optical pulses. The pulsed fiber laser can comprise a pulsed seed laser, such as a fiber delivered pulse seed laser (FDPSL), for providing optical seed pulses (e.g., ps optical seed pulses), at least one optical amplifier (e.g., a fiber amplifier having a gain optical fiber) in optical communication with the pulsed seed laser, and a pulse compressor apparatus in optical communication with the at least one optical amplifier (and hence with the FDPSL). The at least one optical amplifier can operate in a nonlinear regime wherein the optical pulses are spectrally broadened during amplification thereof, such as by, at least in part, self phase modulation. The optical pulses can be broadened by at least selected broadening factor (e.g., by a factor of at least 8). The pulse compressor apparatus can be configured so as to provide a spectral dispersion of at least 50 ps/nm and a compression ratio of no greater than about 50, where the compression ratio refers to the ratio of the time duration of the optical pulses (e.g., ps optical pulses) received by the pulse compressor apparatus to the time duration of the compressed optical pulses (e.g., compressed pulses having ps time duration).

The optical amplifier can receive picosecond optical pulses having a time duration that is at least about 20 ps, or in another example, at least about 40 ps. The optical amplifier can be configured such that the time duration of the optical pulses does not substantially change during optical amplification, such as during optical amplification by the gain optical fiber of an optical fiber amplifier. The pulse compressor apparatus can provide compressed ps optical pulses having a time duration of no less than 2 ps. The pulse compressor apparatus can provide compressed ps optical pulses having a pulse energy of at least 5 µJ.

The optical seed pulses can have a bandwidth of not greater than about 0.5 nm. The time duration of the optical pulses received by the optical amplifier can be substantially the same as the time duration of the optical seed pulses. The time durations can also be different, such as by the pulsed fiber laser apparatus comprising a pulse stretcher optically downstream of the seed laser (e.g., a FDPSL) and the fiber amplifier for providing temporal stretching. For example, the pulse stretcher can be located optically upstream of an amplifier, including being located between amplifiers (e.g., downstream of one and upstream of another). The seed laser can be configured and arranged such that the optical seed pulses have a wavelength of about 1 µm In some practices of the disclosure, the pulsed fiber laser apparatus does not include any pulse stretching that increases the duration of a pulse by more than a factor of 20, or by more than a factor 10, or by more than factor of 5, or more than by 50%, 20% or 10%. Percentage change can be measured by subtracting the time duration of the shorter pulse from that of the longer pulse and dividing by the time duration of the shorter pulse.

The FDPSL can comprise a fiber-based master oscillator, the master oscillator being fiber based at least in that it comprises a laser cavity comprising a length of rare earth doped (RED) optical fiber.

The RED optical fiber can be operated in a normal dispersion regime (i.e., provide normal dispersion at the wavelength of the ps optical seed pulses). The RED optical fiber can be doped with ytterbium and provide ps optical seed pulses in the 1000 nm range (e.g., 1060 nm), and typically in this case the RED fiber has normal dispersion. The RED optical fiber can operate in the anomalous dispersion range, and typically in this case the wavelength of the ps seed pulses will be different (e.g., in the 1550 nm range) and the RED optical fiber is doped with a different rare earth (e.g., erbium), perhaps in conjunction with the ytterbium dopant. The laser cavity can comprise a mode locked laser cavity. The mode locking can comprise passive mode locking. The mode locked laser cavity can comprise a SESAM mode locking element. As other examples, the seed laser can comprise a gain switched or externally modulated laser diode or a diode pumped solid state (DPSS) laser, any of which can comprise a FDPSL.

In one practice of the invention, the optical fiber amplifier comprises substantially only single mode gain fiber. The pulsed fiber laser apparatus can be configured and arranged such that the fiber amplifier comprises an optical gain fiber having a fundamental mode having a mode field diameter (MFD) of not greater than about 14 µm. The pulsed fiber laser apparatus can be configured and arranged such that the fiber amplifier comprises an optical gain fiber comprising a MFD of less than about 25 microns for at least a location along the gain optical fiber. The pulsed fiber laser apparatus can be configured and arranged such that for any optical fiber amplifier optically upstream of the compressor the MFD does not exceed about 14 µm, and/or can be configured and arranged such that the pulsed fiber laser apparatus does not comprise a fiber amplifier having a gain optical fiber that amplifies at a wavelength wherein the gain optical fiber is multimoded.

The pulsed fiber laser apparatus can be configured and arranged such that the fiber amplifier comprises an optical gain fiber comprising a taper wherein the MFD increases along a length of the optical gain fiber. The taper can comprise a taper ratio of at least 1.5.

The pulsed fiber laser apparatus can comprise an optical output in optical communication with the pulse compressor apparatus and configured for delivering compressed ps optical output pulses for material processing, where the compressed ps optical pulses comprise a temporal power profile having a base pulse portion and surge pulse portion within the base pulse portion, the peak power of the surge pulse portion being the peak power of the compressed ps optical pulse, and wherein the surge pulse portion of the compressed optical output pulse comprises, for example, no more than about 75% (or no more than about 65% or about 50%) of the total energy of the compressed optical output pulse.

In various practices of the disclosure the pulsed fiber laser apparatus can be configured and arranged to comprise only single pass amplification. The pulsed fiber laser apparatus can comprise an all fiber construction. The pulsed fiber laser apparatus can comprise a bulk optical amplifier located optical downstream of the optical fiber amplifier. The pulsed fiber laser apparatus can comprise a spectral filter, located optically downstream of the optical fiber amplifier, for spectrally filtering the spectrally broadened optical pulses. The spectral filter can comprise the bulk optical amplifier.

In yet another aspect, the disclosure teaches a pulsed fiber laser apparatus for outputting ps optical pulses, where the apparatus comprises a fiber delivered pulsed seed laser (FDPSL) (e.g., a fiber based master oscillator for providing ps optical pulses), at least one optical fiber amplifier in optical communication with the FDPSL, and a pulse compressor apparatus in optical communication with at least one optical fiber amplifier. The pulsed fiber laser apparatus can be configured and arranged such that the at least one optical fiber amplifier receives ps optical pluses having a time duration of no less than about 20 ps. The at least one optical fiber amplifier can be configured to amplify in a nonlinear regime wherein the received ps optical pulses are spectrally broadened by self phase modulation. The pulse compressor apparatus can provide compressed ps optical pulses having a temporal power profile having a base pulse portion and surge pulse portion within the base pulse portion and wherein the peak of the surge pulse portion is also the peak of the compressed ps pulse temporal power profile. The pulsed fiber laser apparatus can include an optical output in optical communication with the pulse compressor and can be configured for delivering output pulses (e.g., configured for delivering output pulses for materials processing, such as material removal), where the surge pulse portion of the temporal power profile of the output pulse comprises no more than 75% (or no more than about 65% or about 50%) of the total energy of the output pulse.

In some practices of the disclosure, the optical fiber amplifier receives ps optical pulses having spectral bandwidth of no greater than about 0.5 nm. The time duration of the surge pulse portion is, in some practices, no more that 20% of the time duration of the output pulse. The output pulses can have, in some practices of the invention, a time duration of no less than 2 ps. The FDPSL can comprise a fiber based master oscillator having a laser cavity that includes a length of rare earth doped optical fiber.

As noted above, a pulse compressor apparatus of an embodiment of the present invention can provide a spectral dispersion of at least about 50 ps/nm, at least about and/or a pulse compression ratio of not greater than about 50.

The pulse compressor apparatus can comprise at least one chirped volume Bragg grating (CVBG). The at least one CVBG can comprise first and second CVBGs configured and arranged such that the first CVBG receives optical energy having a different polarization state than the optical energy received by the second CVBG. The pulsed fiber laser apparatus can comprise a spectral filter for spectrally filtering the spectrally broadened pulse so as to change the relative optical energies or the relative temporal durations of the surge and base pulse portions. The spectral filter can be tunable, (e.g., one or more of the center wavelength or bandwidth may be tunable). Tuning of the spectral filter can tune the relative time durations or optical energies.

The present disclosure also teaches methods.

In one aspect, the disclosure teaches a method of providing output optical pulses (e.g., picoseconds output optical pulses) with a laser system including an optical fiber amplifier, comprising inputting optical pulses to an optical amplifier (e.g., an optical fiber amplifier having a length of gain-providing optical fiber), amplifying the optical pulses with the optical amplifier (e.g., the gain-providing optical fiber of the optical fiber amplifier) wherein the optical amplifier operates in a nonlinear regime and spectrally broadens the optical pulses by at least a selected broadening factor (e.g., at least a factor of 8); and compressing optical pulses with a pulse compressor apparatus in optical communication with the optical amplifier so as to provide ps compressed optical pulses (e.g., ps compressed optical pulses), the pulse compressor providing a dispersion of at least about 50 ps/nm and a compression ratio of the time duration of the optical pulses received by the compressor apparatus to the time duration of the compressed picosecond optical pulses of no greater than about 50. The amplifier can be configured so as to not substantially change the time duration of the optical pulses during the amplification thereof.

In various practices of the invention, the optical input pulses can have a spectral bandwidth not in excess of about 0.5 nm and/or a time duration of at least about 20 ps. In various practices of the invention the ps compressed optical pulses can have a time duration of no less than about 2 ps.

The optical fiber amplifier can be operated as a single mode optical fiber amplifier. Operating as a single mode fiber amplifier can be accomplished (in accordance with the teachings of the various embodiments herein, including apparatus and systems), such as by, for example, an amplifier comprising only single mode gain fiber or, alternatively, an amplifier comprising multimode gain fiber and being operated single mode. Accordingly, in one practice, the gain optical fiber operates at a wavelength of operation and wherein the gain providing optical fiber is single mode at the wavelength of operation.

The gain providing optical fiber can comprise a taper wherein the mode field diameter of the fundamental mode increases along a length of the gain providing optical fiber. The taper can have a taper ration of at least 1.5.

Inputting optical pulses can comprise providing a pulsed fiber laser comprising a mode locked laser cavity comprising a length of ytterbium doped fiber operating in the normal dispersion regime, the fiber laser comprising a saturable semiconductor absorber mirror (SESAM) mode locking element. The ps compressed optical pulses can have a pulse energy of at least 5 µJ. Inputting optical pulses can comprise providing optical seed pulses having a first temporal duration and temporally stretching the optical seed pulses to increase the time duration thereof.

The method can comprise spectrally filtering the spectrally broadened pulse, and spectrally filtering can comprise optically amplifying with a bulk optical amplifier.

The method can also include providing an optical output in optical communication with the pulse compressor apparatus and configured for delivering ps optical output pulses for material processing. The ps optical output pulses, responsive to the compression, can comprise a temporal power profile having a base pulse portion and a surge pulse portion within the base pulse portion, wherein the peak power of the surge pulse portion is the peak power of the temporal power profile of the ps optical output pulse, and the surge pulse portion comprises no more than 85% of the total energy of the ps optical output pulse. The surge pulse portion can comprise no more than 75%, or no more than 70%, or no more than 65% of the total energy of the ps optical output pulse.

The method can comprise processing a material with the picosecond optical output pulses.

In another aspect, the present disclosure teaches a method of providing ps laser pulses for processing a material, comprising nonlinearly amplifying optical pulses (e.g., ps optical pulses) such that the optical pulses are spectrally broadened and include nonlinear chirp; directing compressed optical output pulse (e.g., a ps compressed optical output pulse) to a material for the processing thereof, including compressing the nonlinearly amplified optical pulse to provide a compressed optical pulse having a temporal power profile having a base pulse portion and a surge pulse portion within the base pulse portion, wherein the peak of the surge pulse portion is the peak of the compressed optical pulse temporal profile, and wherein the surge pulse portion of the compressed optical output pulse has a peak power of at least 500 kW and wherein the optical energy of the surge pulse portion is no more than 75% of the optical energy of the compressed optical output pulse including the surge and base pulse portions thereof. Compressing the nonlinearly amplified ps optical pulses can comprise providing a dispersion of at least 50 ps/nm and/or a compression ratio of no greater than about 50. The optical pulses being nonlinearly amplified can comprise ps optical pulses having a bandwidth of no greater than about 0.5 nm and/or pulse duration of at least about 20 ps.

In various practices of the disclosure, optical seed pulses have a spectral bandwidth of no greater than 5 nm, no greater than 3 nm, no greater than 2 nm, or no greater than 1 nm. In various practices of the invention, the seed pulses have a temporal bandwidth no less than 1 ps and no greater than 100 ps and, by way of example and not limitation, in conjunction with the foregoing the seed pulses typically have a spectral bandwidth of no greater than 2 nm, or, as may be more likely, no greater than 1 nm.

The method can comprise spectrally filtering the spectrally broadened pulses so as to change the relative optical energies or the relative temporal durations of the surge and base pulse portions.

An optical seed laser of the embodiments of the present disclosure, including those described in the methods of apparatus noted herein, can comprise any type of pulsed ps laser that can be fiber delivered (i.e., has an optical fiber output) and that is commensurate for use in the ps pulsed fiber lasers as described in the disclosure herein. For example, the FDPSL can comprise a fiber delivered diode pumped solid state (DPSS) laser; a gain switched diode laser; a diode laser in combination with an external modulator (such as, for example, a Mach Zhender modulator); a microchip laser; or a fiber laser.

In various practices of the disclosure, including any of the apparatus and methods described above, compression can be achieved with a pulse compressor apparatus that provides a dispersion of at least about 100 ps/nm; at least about 150 ps/nm; at least about 200 ps/nm; at least about 250 ps/nm; at least about 300 ps/nm; at least about 350 ps/nm or at least about 500 ps/nm. The compression ratio can be, in various practices of the disclosure as taught herein, such as the methods and apparatus described above, not greater than about 50, not greater than about 30, not greater than about 25, or not greater than about 15. In the many practices of the invention, any of the methods and apparatus embodiments taught herein can use any combination of the foregoing recited spectral dispersions and compression ratios.

Dispersion for compression can be provided by a chirped volume Bragg grating (CVBG), and two or more CVBGs can be arranged to provide even higher dispersion than one of the CVBGs can provide alone. The pulse compressor can comprise at least one CVBG, and can comprise, for example, first and second CVBGs configured and arranged such the first CVBG receives optical energy having a substantially different polarization state than the optical energy received by the second CVBG. The pulse compressor can comprise more than two CVBGs (e.g. three, four or five CVBGs), wherein a first pair of the CVBGs receives optical energy having substantially different polarization states and a second pair receives optical energy having substantially the same polarization state (one of the CVBGs of the first pair can be the same as one of the second pair).

Time duration and spectral bandwidth, unless otherwise specifically defined in a particular instance herein, refers to full width-half maximum (FWHM) duration and bandwidth. The terms "spectral dispersion" and "dispersion" are used interchangeably.

The present disclosure also teaches pulse conditioning methods and apparatus.

In one aspect, the present disclosure teaches a pulse conditioning apparatus comprising a signal splitter for splitting a pulsed input signal into first and second pulsed signals; a spectrally dispersive element configured for subjecting the first pulsed signal to a spectral dispersion for compressing or stretching the first pulsed signal, the first and second pulsed signals being subjected to substantially different spectral dispersion; and a combiner for combining the first and second pulsed signals to an output pulsed signal, the output pulsed signal output comprising pulses having a surge pulse portion and a base pulse portion, at least one of the portions derived at least in part from the spectral dispersion and attendant compression or stretching of the first pulsed signal.

The pulse conditioning apparatus can comprise a polarization beam splitter, where one or both of the signal splitter and the beam combiner comprise the polarization beam splitter. The pulse conditioning apparatus can comprise a polarization controller optically upstream of the signal splitter for allowing the polarization state of the pulsed input signal to be changed. The pulse conditioning apparatus can comprise a time delay arrangement for introducing a time delay to the second pulsed optical signal. The spectrally dispersive element can be configured for compressing (i.e., temporally compressing) the first pulsed signal. The spectrally dispersive element can comprise a grating. The grating can comprise a chirped volume Bragg grating. The grating can have a dispersion of, in one practice o the disclosure, at least 50 ps/nm. The grating can provide a compression ratio of, in one practice of the disclosure, no greater than 50

In another aspect, the disclosure teaches a method of conditioning pulses, comprising splitting an input signal into first and second pulsed signals; subjecting one of the first and second pulsed signals to spectral dispersion so as to temporally compress or stretch pulses of the signal; and combining the first and second pulsed signals to form an output signal comprising pulses having a surge pulse portion and a base pulse portion, at least one of the portions derived at least in part from the spectral dispersion and attendant compression or stretching of at least one of the first and second pulsed signals. The first and second pulsed signal can be subjected to substantially different spectral dispersion. The method can include refraining from subjecting one of the pulses to substantial spectral dispersion as compared to the other of the pulses.

In various practices the method can comprise one or more of the following: changing the state of polarization of pulses of the input signal; varying the polarization state of the input signal so as to vary the optical energies of at least one of the surge and base pulse portions of the output pulses; varying a time delay of one of the first and second pulsed signals so as to change the temporal relationship of the surge and base pulse portions of the output pulses; or varying the optical energy of pulses of at least one of the first and second pulsed signals so as to vary the optical energy of at least one of the surge and base pulse portions.

At least one of the splitting and combining steps can comprise using polarization discrimination. Both of the splitting and combining can comprise using polarization discrimination. Splitting can comprise splitting the input signal into at least two beam paths with a polarization beam splitter. The method can comprise changing the state of polarization of the input signal prior to splitting the input signal with the polarization beam splitter.

In various practices of the disclosure subjecting one of the first and second signals to spectral dispersion can comprise compressing pulses of one of the first and second pulsed signals or stretching pulses of one of the first and second signals. In one practice, the method can include refraining from subjecting one of the first and second pulsed signals to any substantial spectral dispersion. The surge pulse portion can comprises a substantially different state of polarization than a state of polarization comprised by the base pulse portion. In another practice of the invention, the state of polarization of the surge pulse portion is substantially the same as the state of polarization of the base pulse portion.

Various features and aspects of the invention are described herein. The features, aspects and practices described herein may be arranged in any combination with any of the other features, aspects or practices described herein, regardless of the particular exemplary embodiment in which such a feature, aspect or practice is described, except where clearly mutually exclusive or a statement is explicitly made herein that such a combination is unworkable. To avoid undue repetition and length of the disclosure, every possible combination is not explicitly recited as a separate embodiment. The various embodiments of the invention considered disclosed as within the scope of the invention are at least as described in the multiply dependent claims appended hereto.

Figure 1A:
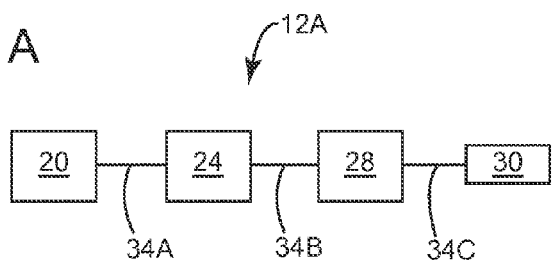
FIG. 1A schematically illustrates an embodiment according to the present disclosure of a pulsed fiber laser apparatus for outputting laser pulses.

Not every component is labeled in every one of the foregoing FIGURES, nor is every component of each embodiment of the invention shown where illustration is not considered necessary to allow those of ordinary skill in the art to understand the invention. The FIGURES are schematic and not necessarily to scale.

When considered in conjunction with the foregoing FIGURES, further features of the invention will become apparent from the following detailed description of non-limiting embodiments of the invention.

DETAILED DESCRIPTION

FIGS. 1A-D schematically illustrate embodiments according to the present disclosure of a pulsed fiber laser apparatus 12A-D for outputting picosecond ("ps") laser pulses. A pulsed fiber laser apparatus 12A can comprise a pulsed seed laser 20, at least one optical fiber amplifier 24 in optical communication with the pulsed seed laser 20, a pulse compressor apparatus 28 in optical communication with the at least one optical fiber amplifier 24, and an optical output 30 in optical communication with the pulse compressor apparatus 28. Optical path 34A provides optical communication between the pulsed seed laser 20 and the least one optical fiber amplifier 24, which communicates with the pulse compressor apparatus 28 via optical path 34B. Optical path 34C provides optical communication between the pulse compressor apparatus 28 and the optical output 30. The at least one optical fiber amplifier 24 is considered optically "downstream" of the pulsed seed laser 20, the pulse compressor apparatus 28 optically downstream of the at least one amplifier 28, and the output 30 optically downstream of the pulse compressor apparatus 28.

Figure 1B:
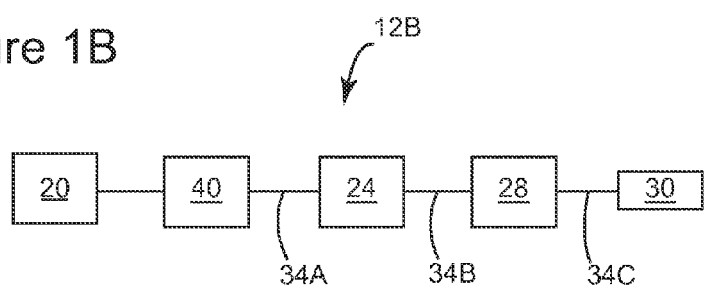
FIG. 1B schematically illustrates another embodiment according to the present disclosure of a pulsed fiber laser apparatus for outputting laser pulses.

With reference to FIG. 1B, a pulsed fiber laser apparatus 12B can optionally include a pulse stretcher in optical communication with the pulsed seed laser 20 and the at least one optical fiber amplifier 24. For example, see the pulse stretcher 40 shown as interposed in optical path 34A, optically downstream of the pulsed seed laser 20. The pulse stretcher 40 can be interposed between the pulsed seed laser 20 and the at least one optical amplifier 24, or interposed between optical amplifiers of the at least one optical fiber amplifier 24, or located optically downstream of the at least one optical amplifier 24. Generally speaking, a pulse stretcher can be located optically upstream of the output 30. A pulsed fiber laser apparatus 12C can also optionally include a spectral filter, such as for example, the spectral filter 44 shown in FIG. 1C as interposed in the optical path 34C between the compressor apparatus 28 and the output 30. As shown in FIG. 1D, a pulsed fiber laser apparatus 12D can include both the optional spectral filter along with the optional pulse stretcher 40. The optional pulse stretcher 40 and spectral filter 44 are discussed in more detail later in this disclosure.

The pulsed seed laser 20 outputs ps pulses, wherein "ps pulses", as that term is used herein, means pulses having time duration of no less than 1 ps and no greater than 500 ps. In various practices of the invention, the pulsed seed laser 20 can provide ps pulses having a time duration of no less than about 25 ps; no less than about 40 ps, or no less than about 80 ps. In other practices of the invention, the pulsed seed laser 20 can provide ps pulses having a spectral bandwidth of no greater than about 0.1 nm, no greater than about 0.5 nm, no greater than about 1 nm, or no greater than about 5 nm. Any of the foregoing recitations regarding spectral bandwidth can be combined with any of the foregoing recitations regarding time duration in the many practices of the invention. The seed pulses provided by the seed laser 20 may, in certain practices of the invention, be substantially transform limited. The seed pulses may, in certain practices of the invention, be substantially unchirped, substantially nonlinearly chirped, or substantially linearly chirped. Typically the pulses are substantially unchirped. The time duration (or spectral bandwidth) of a pulse can be determined by the full width half maximum (FWHM) approach, unless otherwise specified herein.

The output 30 can be configured for outputting ps pulses for use in, for example, processing a material. "Materials processing" or "processing a material", as those terms are used herein, are intended to be broadly construed. For example, processing can include both processing that modifies a material via deliberate material removal (e.g., machining, cutting, drilling, ablating, vaporizing, etc.); processing that modifies with no or much less removal but that includes perhaps some transformation of the material (e.g., marking, printing or internal structural modification, such as heat treating, hardening or annealing, etc.); or processing that characterizes a material with in most instances no permanent transformation, such as by facilitating inspecting, measuring, or characterizing the material (e.g., imaging, illuminating, measuring temperature, causing fluorescence, such as in a fluorescence lifetime imaging measurement, etc.).

The pulsed fiber laser apparatus 12A-D can comprise an all fiber construction, that is, all components can be entirely realized in fiber or at least fiber pigtailed.

The pulsed seed laser 20 preferably comprises a fiber delivered pulsed seed laser ("FSDPSL"). FDPSL can comprise any type of pulsed ps laser that can be fiber delivered (i.e., has an optical fiber output) and that is commensurate for use in the ps pulsed fiber lasers as described in the disclosure herein. By way of example, the FDPSL 20 can comprise a fiber delivered diode pumped solid state (DPSS) laser; a gain switched diode laser; a diode laser in combination with an external modulator (such as, for example, a Mach Zehnder modulator); a microchip laser; or a fiber laser. Of course a pulsed seed laser according to the disclosure can comprise any one of the foregoing lasers absent the fiber delivered feature (e.g., free space output).

The pulsed seed laser 20 can advantageously comprise a mode locked fiber laser, such a fiber delivered mode locked fiber laser. A suitable mode locked fiber laser can comprise passive mode locked laser cavity. The laser cavity can have at one end a fiber coupled semiconductor saturable absorber (SESAM) mirror (SESAM) as a mode locking element and a second reflector (e.g., a fiber Bragg grating or "FBG") at the other end. The laser cavity can also comprise a length of active fiber, such as, for example, a length of rare earth doped (RED) optical fiber. The rare earth dopant can comprise ytterbium. The fiber laser can output ps pulses having a center wavelength of 1064 nm at a pulse repetition frequency (PRF) from between about 20 MHz to about 100 MHz, with the pulses having a pulse energy in the pi range. The average power of the optical fiber laser can be in the range of a few to a few tens of milliwatts.

Figure 1C:
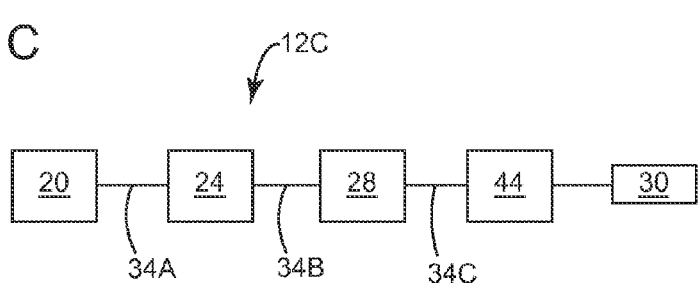
FIG. 1C schematically illustrates an additional embodiment according to the present disclosure of pulsed fiber laser apparatus for outputting laser pulses.
Figure 1D:
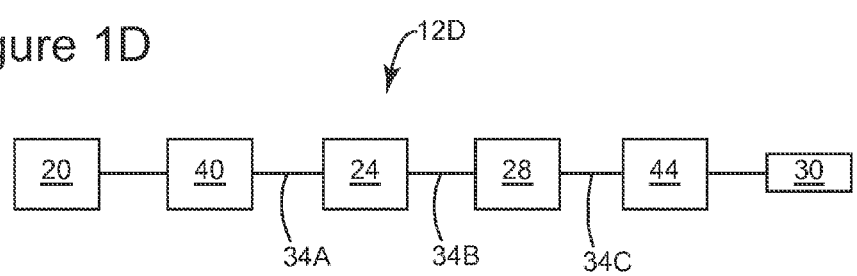
FIG. 1D schematically illustrates a further embodiment according to the present disclosure of a pulsed fiber laser apparatus for outputting laser pulses.
Figure 2:
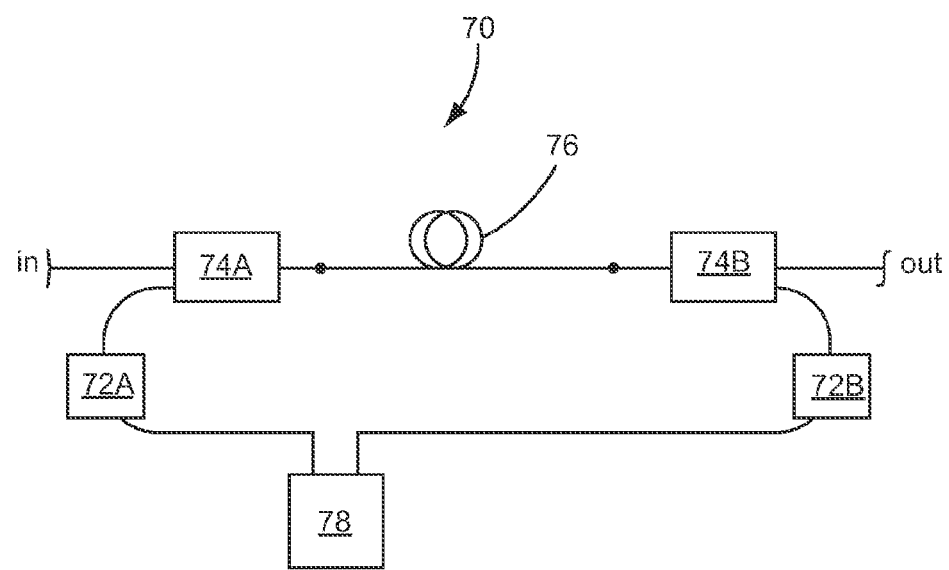
FIG. 2 schematically illustrates one example of an optical fiber amplifier of the pulsed fiber laser apparatus shown in FIGS. 1A-D.

FIG. 2 schematically illustrates one example of an optical fiber amplifier 70 of the at least one optical fiber amplifier 24 shown in FIGS. 1A-D. The optical fiber amplifier 70 of FIG. 2 can include a pair of pump sources 72A and 72B, which can each comprise a fiber pigtailed laser diode, that provide pump optical energy via optical couplers 74A and 74B, respectively, to the length of gain optical fiber 76, which comprises a conventional optical fiber. The length gain fiber typically comprises RED optical fiber. A controller 78 is also shown in FIG. 2, and can control the gain of the amplifier 70 via control of the optical power emitted by the pump sources 72A and 72B, such as by controlling the current supplied to the laser diodes comprised by the pump sources 72A and 72B. Similar control is also possible of the pulsed seed laser 20 of FIGS. 1A-D, by the same or a separate controller. The length of gain RED fiber 76 can comprise single clad fiber and the pump sources 72A and 72B can each comprise a single-mode fiber delivered laser diode delivering, for example, 200 mW of 976 nm optical energy. The optical couplers 74A and 74B can each comprise a WDM optical fiber coupler that couples the 976 nm optical pumping energy to the core of the length of RED fiber 76 while providing low insertion loss to the optical energy being amplified by the length of RED fiber 76. The length of RED fiber 76 can include a Yb-doped core having a diameter of approximately 6 microns and a cladding having a diameter of approximately 125 microns. The core can have a numerical aperture (NA) of approximately 0.14. The core can include a concentration of Yb sufficient, for example, for providing pump absorption greater than 200 dB per meter at 976 nm. One suitable fiber is the YB 500 fiber available from specialty optical fiber manufacturer CorActive High-Tec Inc., having coordinates of 2700 Jean-Perrin, Suite 121, Quebec City, QC, Canada G2C 1S9. As the artisan of ordinary skill can ascertain, the forgoing fiber is of conventional construction.

The length of gain fiber 76 can comprise a length of double-clad fiber, where the fiber comprises RED optical core, surrounded by an inner cladding region which is surrounded by a second, outer cladding region of lower refractive index than the inner cladding. The inner-cladding and outer-cladding index contrast forms a multi-mode waveguide in the inner cladding, into which multimode pump light can be launched. The overlap of the pump light with the RED core of the fiber results in absorption of the pump light by the RED ions and lasing or amplification through stimulated emission of light. Where the length of gain fiber comprises a double clad fiber the pump sources 72A and 72B can be fiber-coupled multi-mode laser diodes delivering up to 10 Watts power at 915 nm or could equally be pump modules comprising multiple laser diodes, the output of which are combined into a multi-mode optical fiber. In the latter case, powers in excess of 40 Watts can be achieved from each of the pump sources for the delivery of very high average power optical amplifiers. The length of gain fiber can comprises a numerical aperture greater than 0.04.

In one practice, the RED amplifier operates single mode, where the gain fiber is entirely single mode and has for example, a core diameter of less than 6 microns and a core NA of approximately 0.14. However, large mode area "LMA" RED fibers and even fibers supporting more than a single mode can be used. Although there is no strict definition in the art as to exactly what constitutes LMA fiber, such fibers are typically characterized by a core having a reduced NA and an increased diameter. For example, an LMA fiber can have a Yb doped core (Yb doping sufficient for one to a few dB absorption in the 915 nm band) having a 20 µm (or greater) diameter and a NA of about 0.07 to 0.09. Such a fiber can provide the amplifier with an output pulses having a pulse energy of, for example, 7 µJ and a peak power (PP) of 150 kW. It can be desirable to avoid operation that would trigger Raman phenomena. Often the peak power of pulses in the power amplifier should not exceed about 150 kW as the threshold value for the onset of Raman scattering. Larger diameter fiber need not always be used, and in some embodiments of the pulsed fiber laser apparatus 12A-D of FIGS. 1A-D the mode field diameter of the fundamental mode does not exceed about 14 microns for any optical fiber amplifier optically upstream of the compressor.

In one approach, the pulsed fiber laser apparatus 12A-D does not comprise a fiber amplifier having a gain optical fiber that amplifies at a wavelength wherein the gain optical fiber is multimoded.

The optical fiber amplifier 70 can comprise a tapered fiber amplifier wherein a feature of the gain fiber 76 (e.g., mode field diameter of the fundamental mode or "MFD") changes (e.g., increases) along at least a selected length of the length of gain fiber 76. The taper profile (plot of magnitude of feature as function of length along fiber) can be substantially linear. A taper can equally have a nonlinear or arbitrary taper profile. For example, the magnitude of the rate of change of a feature with respect to longitudinal length at a first location ("input location) optically upstream of a second location ("output location") can be greater than the magnitude of the rate of change of the feature with respect to longitudinal length at the second location. In another practice found to be useful the opposite is true: the magnitude of rate of change of MFD with respect to longitudinal length along the taper is less at the input location than at the output location. MFD is typically a strong function of the diameter of the core of the gain fiber, and the MFD can be increased along a taper by tapering the core to increase its diameter. Thus the core can have a smaller diameter (and/or fiber can have smaller MFD) at the input location than at the output location. The feature can taper so as to increase substantially exponentially along the length, or can behave according to a power law, or any combination of linear, exponential and power law behavior. The taper profile along the length of the fiber can be designed for improving, including optimizing, the performance of the amplifier in terms of nonlinearity and gain. For example, the effective nonlinear length of an amplifier is defined by both the core-size and the gain profile along the fiber length. By having a non-uniform taper profile the effective nonlinear length of the amplifier can be very short, since the highest gain of the amplifier occurs at a region of the fiber where the MFD is largest. The rate at which the MFD evolves along the length of the fiber can also affect beam properties of the amplified signal.

Preferably the taper is configured such that the core is substantially single mode at the first location. The core can be "large mode area" (LMA) fiber at the first or input location (and along the length of the taper). LMA, for the purpose of this disclosure, can mean a core numerical aperture (NA) of about 0.11 or less at 1060 nm and a core diameter of at least 10 µm.

The gain fiber can be single mode at the first location, having V-value less than 2.405, and at the second location, where, for example the MFD and/or core diameter is increased, the fiber can have a V-value of more than 2.405 (can support more than one transverse mode). The gain fiber can have a tapered section followed by a uniform (substantially untapered) section along which the feature does not substantially change. The uniform section of the fiber can have a larger mode field area than that at the first location. The uniform section can have a V-value greater than 2.405. For example, in one practice a gain fiber can have a core diameter of approximately 10 um and numerical aperture of 0.08 (V-value at 1064 nm<2.405) at a first or input location and hence be single mode and have a core diameter of 30 um or greater (or 40 um or greater) with a waveguide numerical aperture of 0.08 at second or output location (V-value at 1064 nm>2.405). The MFD at the second location can be greater than, for example, 25 um.

As should be clear, the first and second locations need not be transitions to free space. For example, one or both of the first and second location can be locations selected along a length of fiber according to a criterion or criteria noted herein.

The optical amplifier can be configured such that the input beam quality does not substantially degrade along the length of the amplifier, even though the core of the fiber tapers up in diameter such that the core can support higher order modes. That is, although the taper is such that core transitions from substantially single mode to supporting higher order modes, little or no optical energy is transferred into higher order modes. Accordingly, the length of gain fiber can provide an output that is substantially in a single transverse mode and that accordingly has good output beam quality. Beam quality can be measured and quantified according to the "M-squared" or "M2" parameter. Thus even in instances where the gain fiber includes sections where the V-value is greater than 2.405, the optical fiber amplifier can be configured such that substantially only the fundamental mode of the waveguide is excited and propagates as the signal propagates through the device.

In the simplest form of manufacture, not only does the core diameter vary, but so too does the outer diameter of the fiber along the taper. Some or all of the length of the gain fiber, at least a majority of its length, or substantially all of its length can be tapered.

More particularly, a taper can have at the first location a core having a diameter $D_{core-in}$. The core can have the larger diameter $D_{core-out}$ at the second location. The diameter of the core can increase along at least some the length between the locations. The fiber can have a cladding (which can be the first cladding after the core, where cladding refers to a region having an optical function of tending to confine light to a region the cladding surrounds) that also tapers. The cladding can have a diameter at the first location of $D_{clad-in}$ which can increase to a diameter at the second location of $D_{clad-out}$.

By way of example, a tapered gain fiber according to the present disclosure can have a taper ratio (ratio of a feature such as MFD or core diameter at the output or second location to the diameter of the same feature at the input or first location) of at least 1.5, at least 2, at least 2.5, or at least 3. In various practices the taper ratio can be between (inclusive of endpoints of the stated ranges) about 1.5 and about 2, between about 2 and about 3, or between about 3 and about 5. In various practices of the invention, the foregoing recitations regarding taper ratios can apply to $D_{core-out}/D_{core-in}$, or to the ratio $D_{clad-out}/D_{clad-in}$, or to both of the foregoing ratios. In terms of actual diameters of fibers, a tapered fiber can have a core having a diameter that tapers from, for example (again including endpoints), about 10 µm to about 20 µm, from about 10 µm to about 30 µm, from about 10 µm to about 40 µm, or from about 10 µm to >about 50 µm. The length of the gain fiber can be, in various practices of the disclosure, no greater than about 500 cm, no greater than about 250 cm, no greater than about 150 cm, no greater than about 100 cm, no greater than about 75 cm, no greater than about 50 cm, no greater than about 30 cm, or no greater than about 25 cm.

In some practices of the invention the length of the gain fiber can be no longer than 2 meters or no longer than 4 meters and, independent of the foregoing considerations or in conjunction with either of the them, the length along which the gain fiber is tapered is, in certain practices, is no longer than 1 meter. The gain fiber can include an MFD that exceeds 30 um, or exceeds 50 um, or even exceeds 75 um.

The core diameter of a tapered optical fiber can be selected such that pulse-energy handling is not limited. However, equally, if an application does not require substantially single-transverse mode operation, the taper and/or the diameter can be such that the beam quality is not maintained throughout the amplifier.

The tapered gain fiber can have a taper profile arranged such that the tapered gain fiber delivers substantially single mode pulses and wherein the signal intensity therealong remains high enough such that the amplified spontaneous emission (ASE) power is no greater than 10% of the total optical power output and also wherein the optical signal intensity remains low enough such the optical power generated at the first Raman stoke shift is no greater than 10% of the total optical power delivered.

Furthermore, the optical fiber amplifier may be arranged such that amplified spontaneous emission (ASE) power is no greater than 10% of the total optical power propagated along the tapered optical gain fiber. Alone or in combination with the foregoing, the optical fiber amplifier may be arranged such that any optical power generated at the first Raman stoke shift is no greater than 10% of the total optical power provided by the tapered gain fiber. Finally, along or in combination with either of the foregoing, the optical pulses provided by the tapered gain fiber may have a spectrum with a fundamental wavelength and wherein the tapered gain fiber is arranged such that no more than 10% of the total optical power provided by the tapered gain fiber is outside of a 30 nm bandwidth centered about the fundamental wavelength.

In some instances where the length of gain fiber 76 comprises a taper (and particularly where higher pump absorption is desired), the length of gain fiber is preferably substantially core pumped (as opposed to substantially cladding pumped), such as, for example, with substantially single mode pump light from one or both of the pump sources 72A and 72B. However, the tapered length of gain fiber 76 can be cladding pumped. In either case the gain fiber can be substantially single mode or few moded or MM along all or at least part of its length. Regarding higher pump absorptions, the optical fiber amplifier 70 may be configured such that the tapered gain fiber has an absorption rate of pump light of at least 2.5 dB/meter (or at least 5 dB/meter, or at least 9 dB/meter) and/or propagates pulses having a time duration of less than 500 ns and a peak power of at least 100 KW. The higher pump absorptions can advantageously be achieved in many practices with the limits on the length of the gain fiber or taper length noted above.

Although "up" tapers are often described above, a gain fiber can include one or both of "up" tapers (feature increasing in magnitude in a direction optically downstream along the length of gain fiber) and "down" tapers (magnitude of feature decreasing in a direction optically downstream along the length of gain fiber). The foregoing description regarding up tapers can apply to down tapers as well (with feature such as core diameter noted for first location now pertaining to second location and vice versa). Thus although the diameter or other feature is typically smaller at the first location than at the second location, the invention as noted in the embodiments can also be practiced where the opposite is true and the instead of increasing along the taper the aforementioned features can decrease, with the larger and smaller limits above now applying to the down taper.

Also, in regard to tapers useful with the embodiments disclosed herein, see, for example, U.S. Provisional Patent Application 61/644,424, entitled "Amplifying Optical Device Having Tapered Gain Element", filed 8 May 2012, which is incorporated by reference herein.

Typically the optical fiber amplifier 70 is configured as single pass. The pulsed fiber laser apparatus can be configured such that it comprises only single pass amplification and/or not include any regenerative amplification. The time duration of the ps optical pulses received by a gain optical fiber of an amplifier can be, in certain practices of the disclosure, substantially the same as the time duration of the ps optical seed pulses.

As part of what is often referred to as the Kerr effect, high optical pulse intensity in a medium can cause a nonlinear change in the refractive index of the medium, which can in turn lead to a nonlinear phase delay that depends on the optical intensity of the pulse. Stated in other words, when a medium propagates a high peak power optical pulse, the Kerr effect can cause a time dependent phase shift that varies according to the time dependent pulse intensity. The pulse acquires a so-called chirp, that is, a temporally varying instantaneous frequency. Intensity and hence time dependent phase shift is often referred to as self-phase modulation, or SPM, and in propagation in optical waveguides is usually primarily due to the Kerr effect, though other phenomena can also contribute. Although SPM can cause spectral broadening of a pulse, in some circumstances pulses can retain substantially the same bandwidth despite SPM, or SPM can cause spectral compression of a pulse. As one example, where an input pulse having a peak power sufficient to induce SPM in a particular waveguide is substantially unchirped or is up-chirped, the SPM can lead to spectral broadening. However, when an input pulse is down-chirped, the SPM can cause spectral compression (assuming, in the foregoing examples, a positive nonlinear index of refraction).

Other factors can be of importance in determining the effect of SPM. For example, in optical fibers having anomalous dispersion, the dispersion of the fiber can compensate for the chirp added by SPM, and this phenomenon is often employed to lead to the formation of solitons, where the spectral width of a pulse remains constant during propagation, despite the SPM effect. Mode locked fiber lasers operating at, for example, about 1.5 nm (a wavelength at which silica fibers can have anomalous dispersion) can make use of the interplay between anomalous dispersion of the fiber and SPM to form soliton output pulses. Mode locked fiber lasers can also form soliton-like pulses, with little or no overall spectral broadening of the pulse, where the fiber has normal dispersion at the wavelength of operation but a spectrally dispersive element is added to the laser cavity such that the overall cavity dispersion is anomalous. In such cases, increasing the output power of a pulse propagating in or emanating from a laser or amplifier does not necessarily result in spectral broadening of the pulse, even where power levels are such that SPM is occurring.

The length of RED gain fiber 76 in any of the embodiments disclosed herein can be configured to can serve as a gain optical fiber that optically amplifies by operating in a nonlinear regime wherein ps optical pulses are spectrally broadened during amplification thereof, at least in part by SPM, by a selected factor (e.g., by a factor of at least 8). The spectral broadening adds spectral components that contribute, typically substantially, to the subsequent compression of the pulse. The spectral broadening provides new or enhanced (e.g., in terms of spectral power distribution) spectral components on which the spectral dispersion of the pulse compression process acts in compressing the pulse. The length of RED fiber 76 is typically also normally dispersive. The pulsed apparatus 12A-D can be configured such that the length of RED fiber 76 receives ps optical pulses having a time duration that is at least about 40 ps, at least about 60 ps, at least about 75 ps, or at least about 100 ps. The pulsed seed laser 20 (e.g., FDPSL) can provide such pulses or, as another possibility, the pulsed seed laser 20 can generate shorter time duration pulses which can be stretched by the optional pulse stretcher 44 before being received by the length of RED optical fiber 76. Typically the optical fiber amplifier 70 is configured such that the time duration does not substantially change during the optical amplification by the length of RED optical fiber 76.

The nonlinear propagation in an optical fiber amplifier is well described by the nonlinear Schrodinger equation and can be solved numerically by a split-step Fourier method. The modeling procedure can be programmed on a computer following the equations and numerical solutions described in Chapter 2 of *Nonlinear Fiber Optics* by Govind P. Agrawal. Some assumptions can be in order, as is understood by the skilled worker. For example, the gain in the fiber amplifier can be modeled as constant along the amplifier as a helpful initial simplification when modeling a counter-pumping scheme.

Figure 3A:
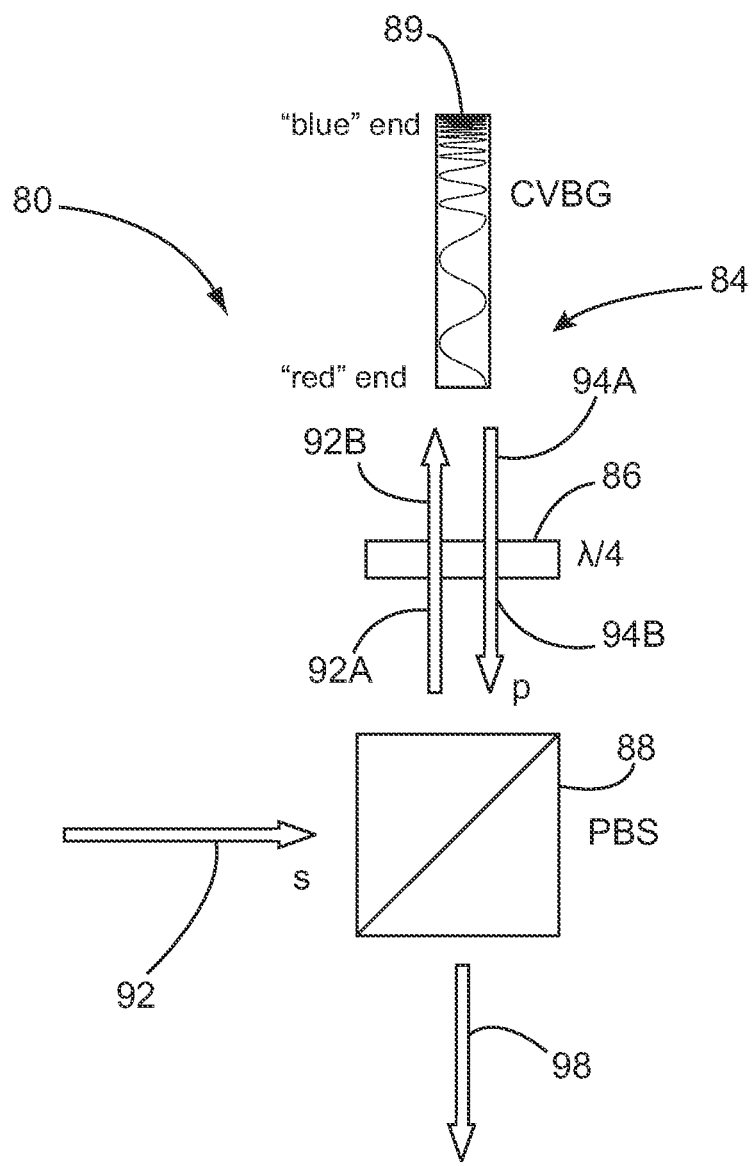
FIG. 3A schematically illustrates one example of a pulse compression apparatus of the pulsed fiber laser apparatus of FIGS. 1A-D.

FIG. 3A schematically illustrates one embodiment of a pulse compression apparatus 28 of FIGS. 1A-D. The pulse compression apparatus 80 can include a spectrally dispersive element 84, a λ/4 wave plate 86 and a polarization beam splitter (PBS) 88. The spectrally dispersive element 84 can comprise, for example, a chirped fiber Bragg grating (CFBG), a chirped volume Bragg grating (CVBG) or a diffraction grating pair. CVBGs are advantageous because they can provide a fairly large amount of spectral dispersion for a rather compact volume and are typically preferred. CVBGs are understood to be available from a number of sources, including, for example, OptiGrate Corporation, 3267 Progress Drive, Orlando, Fla. 32826, USA. (www.optigrate.com). Accordingly, the spectrally dispersive element 84 of the pulse compression apparatus 80 is shown as comprising the CVBG 89 in FIG. 3A.

With reference to FIG. 3A, consider the input beam 92, which can arrive along optical path 34B of FIG. 1A-D, to have linear polarization designated by the letter "S". Assume that the PBS 88 directs S polarized beams orthogonally and passes beams having P (linear but orthogonal to S) polarization. The PBS 88 can redirect the S polarized beam 92 as beam 92A. The λ/4 plate 86 can be oriented to transform beam 92A to beam 92B having circular polarization, which upon reflection as beam 94A from the CVGB 89 is now compressed. Reflection from the CVBG 89 also reverses the "handedness" of the circular polarization of beam 94A relative to beam 92B. That is, if beam 92B was right hand circular polarized (RHCP), beam 94A is left hand circularly polarized (LHCP), and vice versa. The λ/4 plate 86 now transforms beam 94A to linearly polarized beam 94B having polarization "P" that is orthogonally polarized relative to S polarized beam 92A. The PBS 88 passes the P polarized beam 94B, with some loss, as the output beam 98, which can be provided, with or without additional conditioning, to the optical output 30 of FIGS. 1A-D.

Figure 3B:
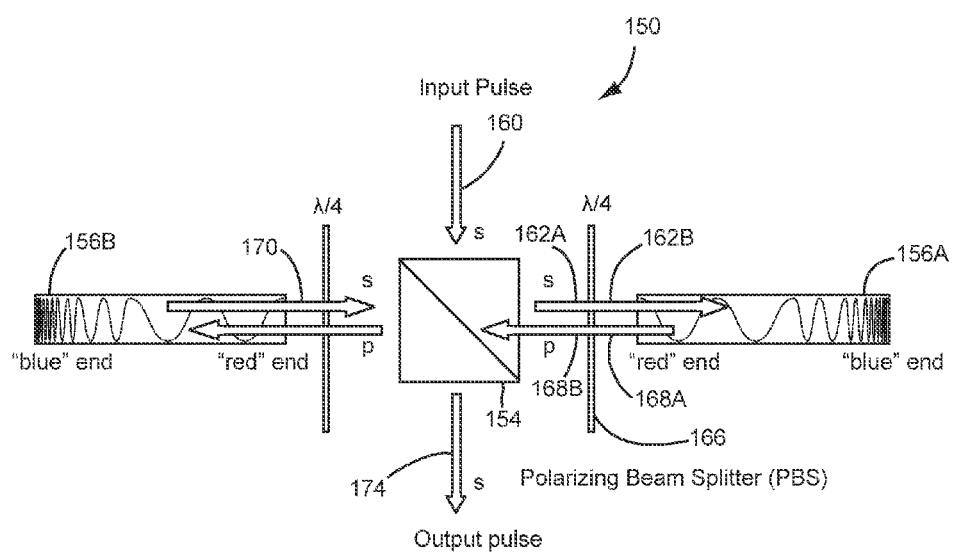
FIG. 3B schematically illustrates another example of a pulse compression apparatus of the pulsed fiber laser apparatus shown in FIGS. 1A-D.

FIG. 3B schematically illustrates another embodiment of a pulse compression apparatus 28. The pulse compression apparatus 150 of FIG. 3B comprises the PBS 154 and first and second spectrally dispersive elements, shown in FIG. 3B as first and second CVBGs 156A and 156B, respectively. Each of the CVBGs provides spectral dispersion, such that the pulse compression apparatus 150 can provide higher dispersion than the embodiment of FIG. 3A that uses a single CVBG. The PBS 154 redirects the input beam 160 having S polarization to the S polarized beam 162A. The λ/4 wave plate 166 is oriented so as to transform the linearly polarized S beam 162A to the circularly polarized beam 162B, which reflects from the first CVBG 156A as beam 168A, and is compressed relative to beam 162B. Because beams 162A and 168A each pass through the λ/4 plate 166 and because of the reflection from the CVBG 156A, the λ/4 plate 166 transforms beam 168A to P polarized beam 168B, which passes through the PBS 154 to the second CVBG 156B, which provides further dispersion and further compression. A λ/4 plate is also associated with the second CVBG 156B, as shown in FIG. 3B, such that the beam 170 is S polarized and is redirected by the PBS 154, with some loss, of course, to provide the output beam 174, which can be provided, with or without further conditioning, to the output 30.

Figure 3C:
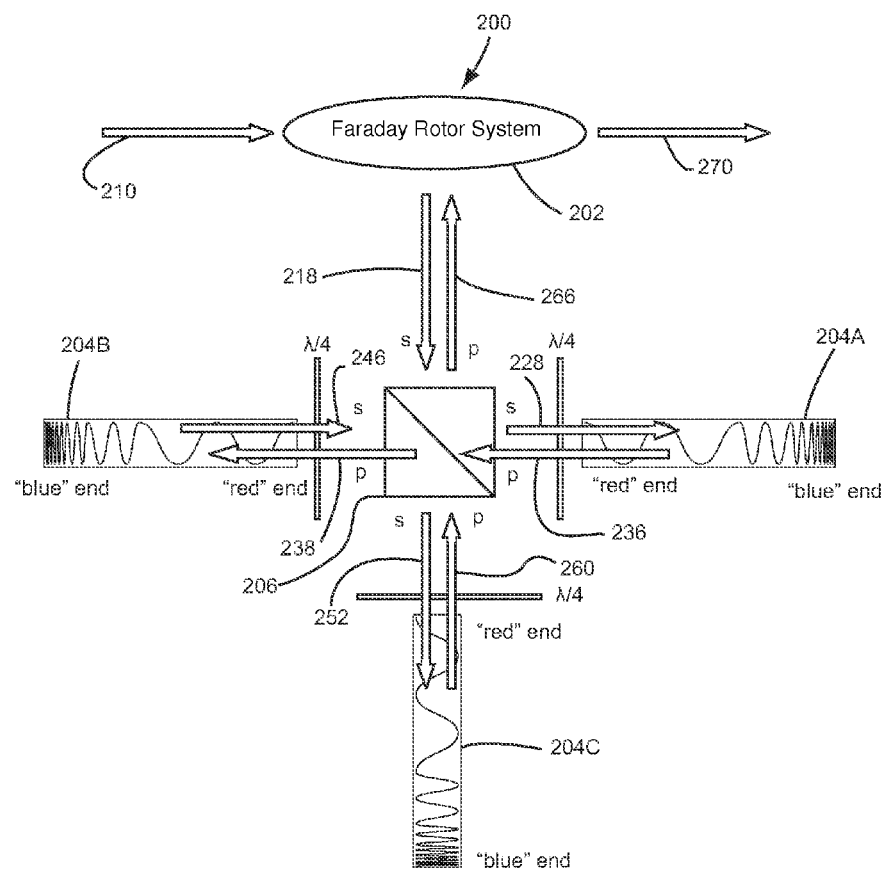
FIG. 3C schematically illustrates yet a further example of a pulse compression apparatus of the pulsed fiber laser apparatus shown in FIGS. 1A-D.

FIG. 3C schematically illustrates another embodiment of a pulse compression apparatus 28. The pulse compression apparatus 200 includes an optical circulator (labeled "Faraday Rotator System" in FIG. 3C) 202, three spectrally dispersive elements, which, as shown in FIG. 3C, can comprise the first, second and third CVBGs 204A, 204B and 204C, respectively, each having an associated λ/4 wave plate, and the PBS 206. The optical circulator 202 redirects the input beam 210 to S-polarized beam 218, which the PBS redirects to beam 228. Beam 236, which is now compressed due to prior reflection from first CVBG 204A, now has P polarization and is passed through the PBS to emerge as beam 238. After compression by second CVBG 204B, S-polarized beam 246 is directed by PBS 206 to third CVBG 204C, and beam 260, now P polarized and compressed by all three CVBGs, is passed by PBS 206 as beam 266 to the optical circulator 202, and exits the circulator as beam 270.

It is noted that the embodiments of the pulse compressor apparatus shown in FIGS. 3A, 3B and 3C can be used in combination to provide increased spectral dispersion. For example, the output 174 of the pulse compressor apparatus 150 of FIG. 3B can be directed to the input 210 of the pulse compressor 200 of FIG. 3C, such that five spectrally dispersive elements act to provide pulse compression. Other combinations of the pulse compressor apparatus shown in FIGS. 3A, 3B and 3C are possible and within the scope of the invention, as the skilled worker, cognizant of the present disclosure, will ascertain upon reflection. Furthermore, any of the pulse compressor apparatus of FIGS. 3A, 3B and 3C can become a pulse stretching apparatus by reversal and of the red and blue ends of the spectrally dispersive elements shown in the FIGURES.

Figure 4A:
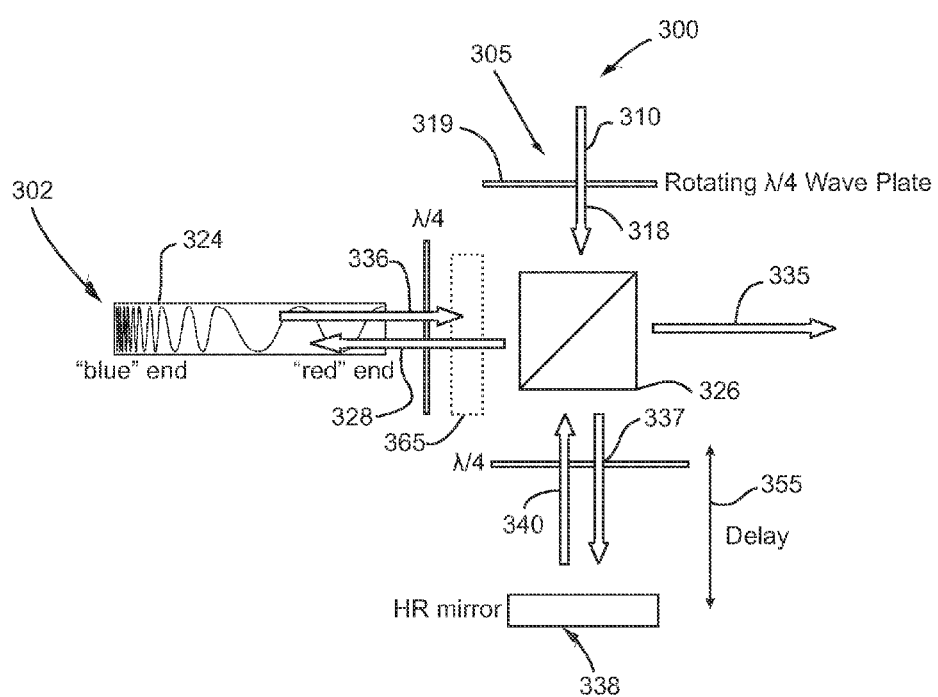
FIG. 4A schematically illustrates an example of a pulse conditioning apparatus.

FIG. 4A schematically illustrates an example of a pulse conditioning apparatus 300 according to the present disclosure. In the embodiment shown in FIG. 4A, the pulse conditioning apparatus 300 includes a spectrally dispersive element 302 arranged for compression and accordingly the pulse conditioning apparatus 300 as Illustrated in FIG. 4A is considered to comprises a pulse compression apparatus. However, as explained in more detail below, the pulse conditioning apparatus 300 of FIG. 4A has independent application and could include spectrally dispersive elements configured for pulse stretching as opposed to pulse compression. A pulse conditioning apparatus 300 can, in some of its embodiments, shape a pulse without compression. Also, in a general case the spectrally dispersive element 302 can include any of the pulse compressor (or pulse stretcher apparatus, as noted above) shown in FIG. 3A, 3B or 3C.

The pulse conditioning apparatus 300 of FIG. 4A can include polarization controller 305 that can change the state of input beam or optical energy 310 such that beam 318 has a polarization state that is selectively different than that of beam 310. In the embodiment of FIG. 4A the polarization controller 305 comprises a rotatable λ/4 wave plate 319. The pulse conditioning apparatus 300 also includes the spectrally dispersive element 302, which in the embodiment shown in FIG. 4A comprises a CVBG 324 arranged for compression, a PBS 326, a highly reflective element 338, and two λ/4 waveplates (not indicated by reference numerals).

To understand one mode of operation of the pulse conditioning apparatus 300, consider that the input optical energy 310 comprises linearly polarized (e.g., s-polarized) light, and that rotatable wave plate 319 is configured such that beam 318 is circularly polarized and can be considered, as the skilled worker understands, to comprise equal intensity s and p polarizations having an appropriate phase relationship. The PBS 326 redirects the s polarized part of beam 318 to the left. After passing through the λ/4 plate the beam is incident on the CVBG 324 as circularly polarized beam 328, which upon reflection from the CVBG 324 is re incident on the λ/4 plate as the opposite handed circularly polarized and compressed beam 336. The λ/4 plate converts beam 336 to p polarized light, which is passed to the right by the PBS 326 to the output 335. The operation of the λ/4 plate in conjunction with a reflector, such as the CVBG 324, has been described more than once at this point and is familiar to the reader.

The p polarized portion of light beam 318 passes through the PBS 326 as beam 337 and after the usual polarization transformation and reflection from reflective element 338, shown as a simple highly reflective (HR) mirror. The beam 340 is redirected by the PBS 326 in the s-polarized state to the output 335 with a time delay 355 that can be adjusted via the position of the reflective element 338 relative to the PBS 326.

The pulse conditioning apparatus 300 therefore form an output 335 from two pulsed beams where the pulses of one of the beams can have different time duration than the pulses of the other beam. The two beams can be formed by splitting an input beam into two beams and subjecting them to different spectral dispersion so as to, for example, compress one of the beams. Spectral dispersion can be different in a number of ways, including quantitatively (absolute value of ps/nm) as well as qualitatively (compression or stretching, which can be indicated by the sign of the ps/nm). The pulse conditioning apparatus can also provide for time delay of one of the beams, which can provide a relative time delay between the two beams. In one practice of the disclosure, the dividing and recombining can be based on polarization discrimination.

Figure 4B:
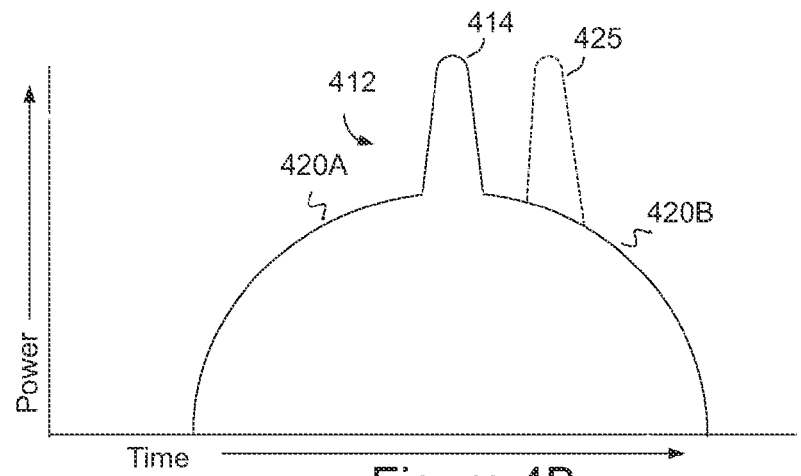
FIG. 4B schematically illustrates one example of an output pulse having surge and base pulse portions.

With reference to FIG. 4B, the pulse conditioning apparatus 300 can output a pulse 412 comprising a surge pulse portion 414 (derived at least part from compression by the CVBG 324) and a base pulse portion represented by reference numerals 420A and 420B (derived at least in part from uncompressed beam 340 reflected from the HR mirror). The pulse conditioning apparatus 300 can allow temporal relationship of the surge and base pulses to be varied (such as, for example, via adjustment of the optical delay 355) to shift their relative position in time. For example, the time delay 355 can be changed such the surge pulse moves relative to the base pulse to the position indicated by reference numeral 425. Thus the surge pulse can lead the base pulse, be largely centered within the base pulse, or can trail the base pulse. The surge pulse can even be temporally spaced from the base pulse such that they are in effect different pulses.

Figure 4C:
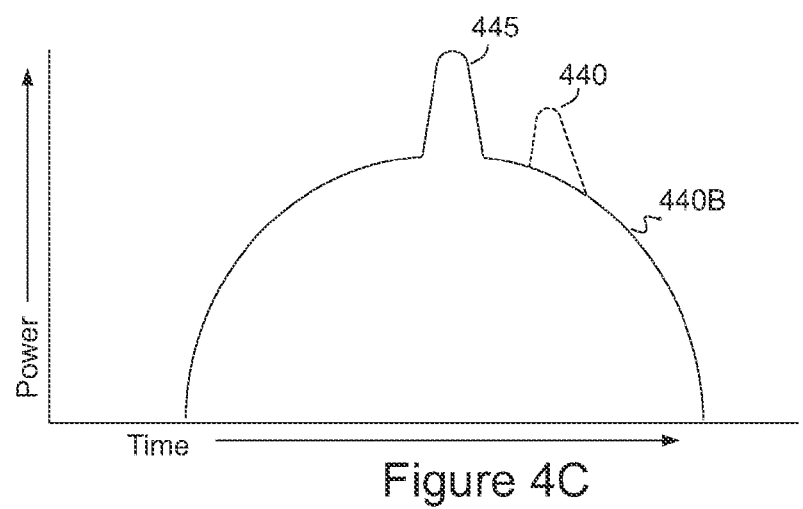
FIG. 4C schematically illustrates another example of an output pulse having surge and base pulse portions.

Rotating the wave plate 319 can provide polarization control that can change the relative proportion of s polarized to p polarized light of the beam 318 and hence the amount of energy in the surge pulse portion relative to the amount of energy in comprised by the base pulse portion. For example, with reference to FIG. 4C showing output pulse 432, increasing the p polarization content of the beam 318 can increase the energy in the base pulse, represented by reference numerals 440A and 440B of FIG. 4C, and decrease the energy in the surge pulse 434, as can been seen by comparison of FIGS. 4B and 4C. Adjustment of the time delay can move the surge pulse to the location indicated by reference numeral 445, as in the case of the FIG. 4B.

In the embodiment shown in FIG. 4A the reflective element 338 is shown as highly reflective mirror. However, the reflective element 338 can comprise a spectrally dispersive element that can provide compression or stretching, such as providing a spectral dispersion that is substantially the same as, or different than or substantially different than, the spectral dispersion provided by the spectrally dispersive element 324. Generally speaking, the pulse conditioning apparatus provides different amounts of spectral dispersion to two signals or beams and then combines them to form an output. One of the signals can be more or less compressed than the other, where "less compressed" can include stretching.

Typically the compressed and less compressed portions (e.g., the surge and base pulse portions) of the output 355 will comprise different polarizations. In many applications this may be advantageous, or at least of little or no detriment. In other cases, however, it may be desirable to condition the polarization of the one or both the compressed and less compressed pulse portions so as to change the polarization difference between the two. For example, the polarization of one of the pulse portions could be modified to be substantially the same as the other of the polarizations, such as by use of appropriate beam splitting and Faraday rotation elements, a fast polarization controller, etc.

The pulse conditioning apparatus 300 can optionally include the spectral filter 365 which can provide spectral filtering according to any of the teachings herein regarding such filtering. Spectral filtering is described elsewhere in conjunction other aspects and embodiments of then invention, and those teachings are not repeated here as the skilled worker will appreciate that they are applicable to the pulse conditioning apparatus 300 and/or its use in a pulse laser apparatus.

The pulse conditioning apparatus 300 is exemplary. As one of ordinary skill informed of the present disclosure will appreciate, a pulse conditioning apparatus can have a different structure than the particular embodiment shown in FIG. 4A. For example, a pulse conditioning apparatus can include a fiber based beam splitter having first and second outputs and a spectrally dispersive element in optical communication with one of the outputs for providing, for example, compression or stretching. The spectrally dispersive element can be tunable (e.g., a piezo electrically tunable FBG). The other output can be (optionally) directed through a variable or fixed time delay arrangement. A second combiner (e.g., a fiber combiner) can combine the spectrally dispersed signal with the other signal into an output path. The pulse compressor 44 can comprise the pulse compressor of a pulse conditional apparatus described above.

Figure 5A:
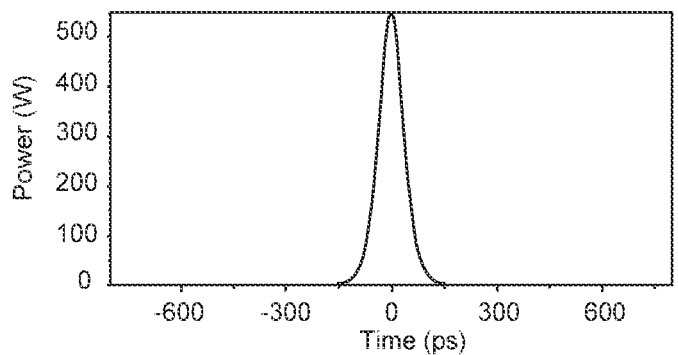
FIGS. 5A, 5B and 5C schematically illustrate, respectively, the pulse duration, pulse spectrum and chirp of an example of a seed pulse provided by a seed source according to the apparatus and methods of the present disclosure.
Figure 5B:
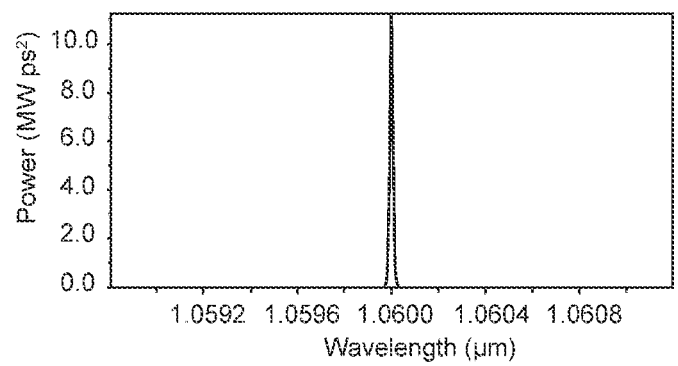
Figure 5C:
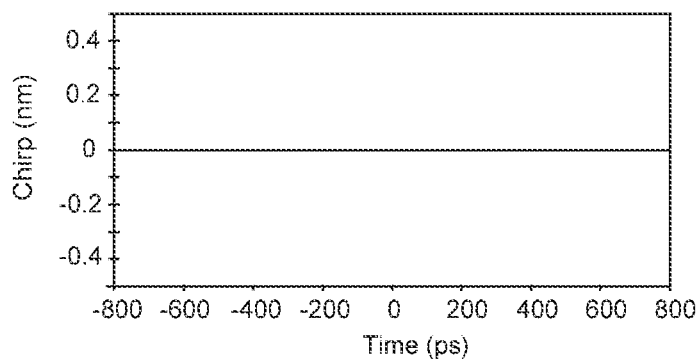

FIGS. 5A, 5B and 5C schematically illustrate, respectively, the pulse duration, spectral power profile and chirp of an example of a seed pulse provided by a seed source according to the apparatus and methods of the present disclosure. With reference to FIG. 5A, which shows the pulse temporal power profile, the seed pulse can have a time duration of approximately 80 ps. With reference to FIG. 5B, the seed pulse can have a spectral bandwidth of approximately 0.015 nm. As indicated by FIG. 5C, the seed pulse can be substantially unchirped. The seed pulse can have a peak power of, for example, less than about 1 kW and a pulse energy of, for example, less than 100 nJ (about 550 W and 50 nj, respectively, for the pulse shown in FIGS. 6A-6C).

Figure 6A:
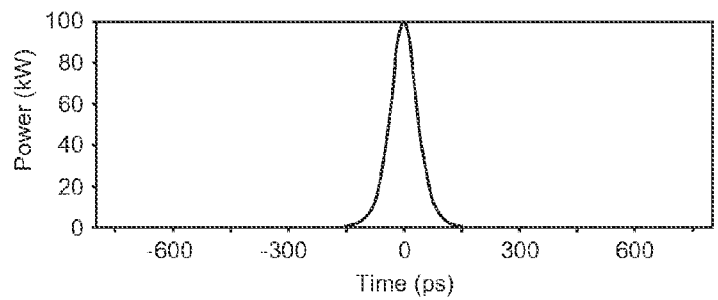
FIGS. 6A, 6B and 6C schematically illustrate, respectfully, an example of the temporal power profile, spectral power profile and chirp of pulses after nonlinear amplification according to the methods and apparatus disclosed herein.
Figure 6B:
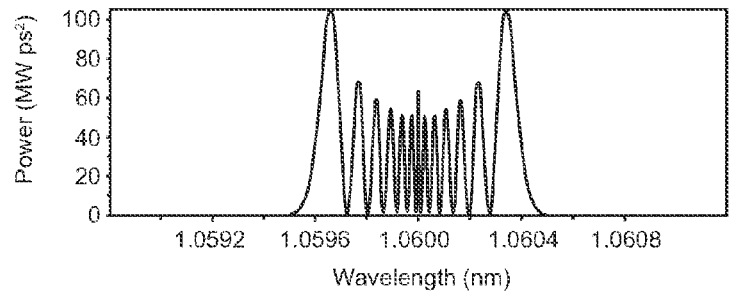
Figure 6C:
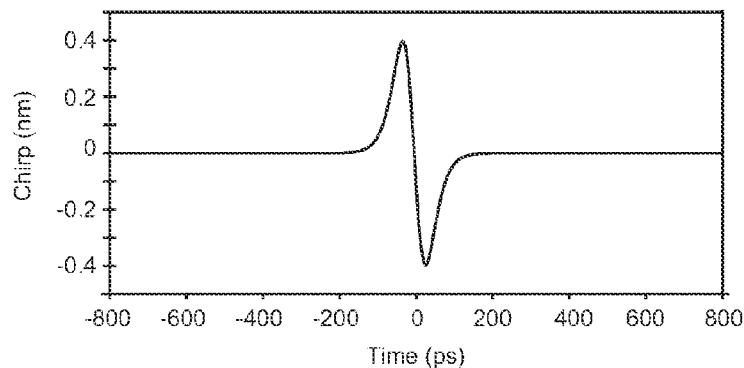

FIGS. 6A, 6B and 6C schematically illustrate, respectfully, an example of the temporal power profile, spectral power profile and chirp of pulses after nonlinear amplification according to the methods and apparatus disclosed herein. With reference to FIG. 6A, the nonlinearly amplified pulse has time duration that is substantially the same as that of the seed pulse of FIG. 5A, namely, 80 ps. However, with reference to FIG. 6B, the spectral profile is substantially different from the spectral profile of the pulse before nonlinear amplification shown in FIG. 5B. The spectral width of the nonlinearly amplified pulse of FIG. 6B is about 0.776 nm, and includes many undulations and attendant local minima and maxima, as well as a pair of outer "wings", representing, for the spectrum shown in FIG. 6B, a pair of substantially equal maxima. With reference to FIG. 6C, the chirp of the nonlinearly amplified pulse can also be substantially different than the chirp of a pulse prior to nonlinear amplification shown in FIG. 5C. The pulse of FIGS. 6A-6C is substantially chirped, including being substantially nonlinearly chirped.

The nonlinearly amplified pulse of FIGS. 6A-6C has a peak power of approximately 110 W and a pulse energy of 9.1 µJ. Thus the nonlinearly amplified pulses can have a peak power of at least, for example, 100 kW and a pulse energy of at least, for example, 8 µJ.

Figure 7A:
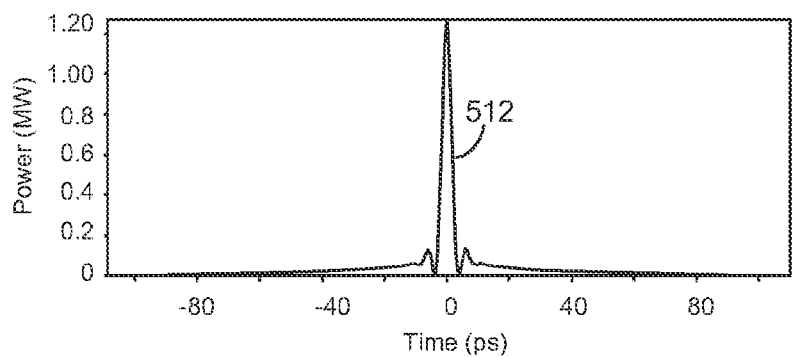
FIGS. 7A, 7B, and 7C schematically illustrate, respectfully, an example of the temporal power profile, spectral profile and chirp of pulses after compression according to the methods and apparatus disclosed herein.
Figure 7B:
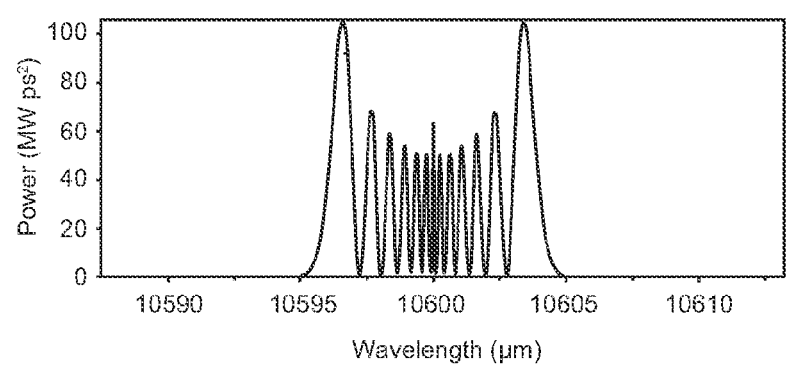
Figure 7C:
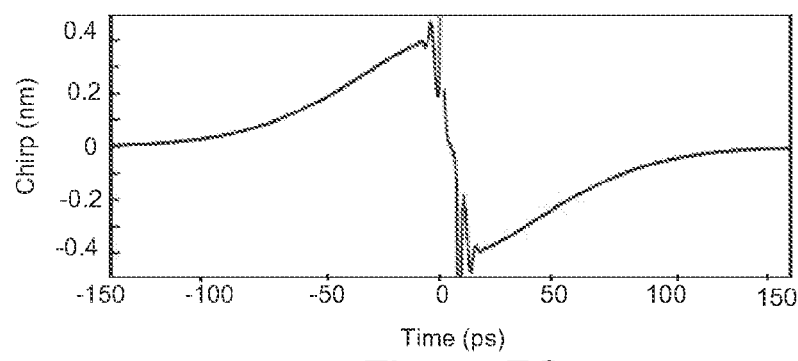

FIGS. 7A, 7B, and 7C schematically illustrate, respectfully, an example of the temporal power profile, spectral power profile and chirp of pulses after compression according to the methods and apparatus disclosed herein. The pulse shown in FIGS. 7A-7C is modeled as compressed with a chirped volume Bragg grating having a spectral dispersion of 55 ps/nm. The compressed pulse has a FWHM time duration of about 3.6 ps (for a compression ratio 80/3.6 of approximately 22.2), a peak power of about 1.2 MW and a pulse energy of about 9.1 µJ. The peak power is less than a simple calculation of the time duration of the compressed pulse divided by the overall pulse energy because, for this particular embodiment, some energy remains in a base portion of the pulse and the base portion that is does not contribute to in FWHM determination of the pulse width (see additional discussion below). Also, the modeling does not include any loss incurred during the pulse compression process. With reference to FIG. 7B, the compressed pulse comprises a spectral bandwidth of about 0.774 nm and can also include a pair of outer wings, representing, for the spectrum shown in FIG. 7B, a pair of substantially equal maxima. As indicated by FIG. 7C, the compressed pulse comprises a nonlinear chirp.

Figure 8:
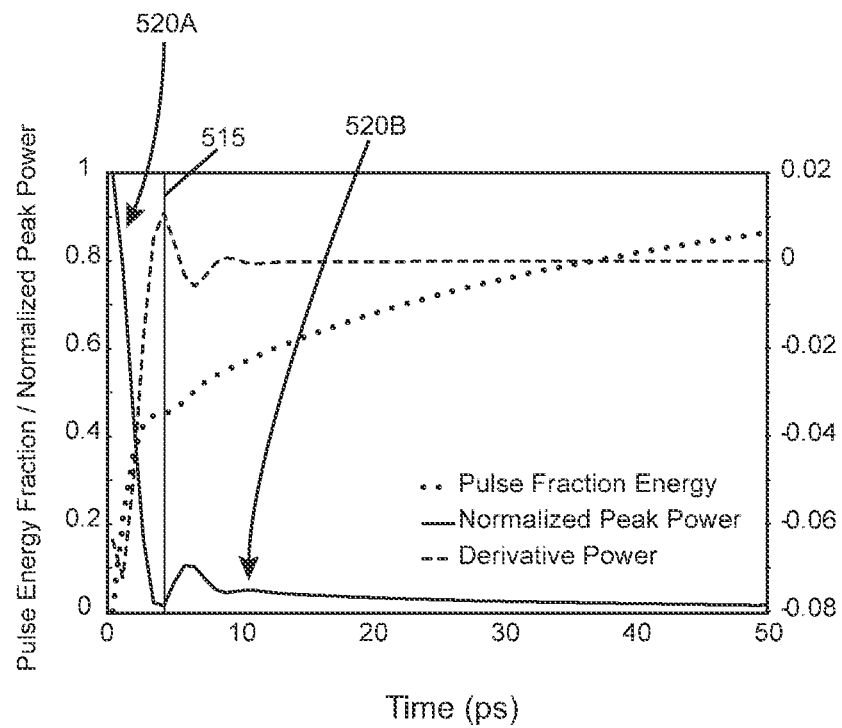
FIG. 8 schematically plots normalized peak power, pulse fraction energy, and derivative power for the compressed pulse represented by FIGS. 7A, 7B and 7C.

FIG. 8 schematically plots normalized peak power, pulse fraction energy, and derivative power for the compressed pulse represented by FIGS. 7A, 7B and 7C. The curve labeled "Normalized Peak Power" is the right hand half of the plot shown in FIG. 6A, with the vertical power scale now plotted as normalized to one. The vertical line 515 separates the pulse into surge pulse (indicated by reference numeral 520A) and base pulse (indicated by reference numeral 520B) portions. A similar vertical line, not shown, can be drawn for the left hand part of the pulse, with surge pulse portion being located between the right hand (line 515) and left hand (not shown) lines. The vertical line 515 crosses the Pulse Fraction Energy curve at a pulse fraction energy of about 45%, indicating that the surge pulse comprises about 45% percent of the energy of the overall pulse. The percentage of the energy included in the surge pulse portion can be a function of factors including the spectrum of the pulse and the degree of nonlinearity of the chirp. The degree of nonlinearity can be different for different parts of the spectral profile. For example, the aforementioned spectral "wings" shown in FIG. 6B correspond to the more highly nonlinearly chirped portions of the pulse and are understood to contribute to formation of the base pulse portion of the overall pulse. The derivate power curve is the derivative of the normalized peak power curve.

In certain practices of the disclosure, pulses compressed by the pulse compression apparatus described herein (e.g., such as in any of the embodiments described above) can have a time duration of no less than about 2 ps and/or a pulse energy of at least 5 µJ. Typically the pulse compression apparatus provides a dispersion of at least 50 ps/nm and/or provides a compression ratio (ratio of the time duration of the ps optical pulses received by the pulse compressor apparatus to the time duration of the compressed ps optical pulses) of no greater than about 50. However many variations are possible, as noted below.

A pulse compressor apparatus of a pulsed fiber laser as disclosed herein, such as in, for example, the specific embodiments of methods and embodiments described above (and below), can provide a spectral dispersion of at least about 50 ps/nm, at least about 100 ps/nm, at least about 150 ps/nm, at least about 200 ps/nm, at least about 250 ps/nm, at least about 300 ps/nm, at least about 350 ps/nm, at least about 400 ps/nm, or at least about 500 ps/nm. In any combination with any of the foregoing, the pulse compression apparatus can provide different compression ratios, such as, for example, a pulse compression of no greater than about 200, no greater than about 150, no greater than about 125, no greater than about 100, no greater than about 75, no greater than about 30, no greater than about 25 or no greater than about 15.

A fiber amplifier of the present application is typically configured to operate in a regime where the length of the gain fiber is less or much less than the dispersion length (Zd) of the pulse being amplified. This is not typically understood to be desirable, as in such a regime the nonlinear chirp associated with spectral broadening in the nonlinear fiber amplifier will affect the pulse compression, such as by causing the compressed pulse to include an undesirable "pedestal". Pedestal-free or reduced pedestal pulses are typically understood to result from the condition opposite to the above—amplifier operation in the regime wherein the length of the gain fiber is much greater than the pulse dispersion length.

Without wishing to be bound by theory (except in a claim where specifically recited) some discussion may be helpful. In pulse compression it is usually desirable that the chirp across the pulse to be compressed is as linear as possible. Unfortunately, nonlinear amplification typically introduces significant nonlinear chirp. However, even in the presence of such nonlinear chirp, the chirp of the pulse can be linearized, at least to some extent, if the nonlinear gain medium has an optical length that is much longer than the dispersion length Zd of the pulse. Consider equations (1) and (2) below. Equation (1) simply states the length of the gain fiber to be much greater than the dispersion length of the pulse:

$$Z_a >> Z_d \text{ where } Z_d = \tau^2/k'' \quad (1)$$

In expression (1) $\tau = \tau_{exp}/1.76$ and $$k'' = (\lambda^2/2\pi c)D, \quad (2)$$

where $\tau_{exp}$ is the measured pulse width and D is the fiber dispersion in ps/nm km.

If $\lambda=1064$ nm and D=−40 ps/nm km, then $k''=7.5^- 10^{-28}$ sec$^2$/cm and for $\tau_{exp}=10$ ps we have $Z_d=460$ m.

Thus for high quality (pedestal free) compression of 10 ps pulses it is preferable to use an amplifier (gain fiber) length much longer than 460 m. This is completely impractical in most instances.

However, if 1 ps pulses are used instead of 10 ps pulses, then the dispersion length Zd becomes just 4.6 m; for a 0.5 ps or 500 fs pulse, the dispersion length Zd is 1.1 m. 4.6 m and 1.1 m are much closer to practical lengths of gain fiber used in an amplifier.

|  | Pulsewidth | | |
|---|---|---|---|
|  | 0.5 ps | 10 ps | 100 ps |
| Fiber Dispersion |  | 40 ps/nm km | |
| Dispersion Length $Z_d$ | 1.1 m | 460 m | 46 km |

Generally speaking the shorter the pulse width, the closer the approximation to the condition Za>>Zd. Nevertheless, in many practices of the present disclosure, longer ps pulse widths are used such that the gain fiber length is much shorter than the dispersion length Zd. However, Applicants consider that this condition, typically considered to be a disadvantage, can in fact allow for a simplified method of providing temporally shaped pulses useful for material processing, such as the pulses described herein as having a surge and base pulse portions. Accordingly, the apparatus and methods described herein as producing pulses have surge and base pulse portions can include a nonlinear optical amplifier, or involve nonlinear amplification, wherein the length optical gain medium (e.g., length of optical gain fiber) is not substantially greater than the dispersion length. The length of the optical gain medium can be on the order of, or less than, the dispersion length.

Accordingly, in certain practices of the disclosure, a compressed pulse is formed having a temporal power profile having a base pulse portion and surge pulse portion within the base pulse portion is used for materials processing. Temporal pulse profiles other than a Gaussian temporal profile have been found useful in ns systems for material removal. See, for example, U.S. Pat. No. 7,348,516, entitled "Methods of and Laser Systems for Link Processing Using Tailored Pulses with Specially Tailored Power Profiles", issued Mar. 25, 2008 to Sun et al. Applicants consider that non-Gaussian temporal pulse profiles can be of use for ps materials processing, and in particular pulses formed from what may normally be considered flawed pulse compression.

Figure 9:
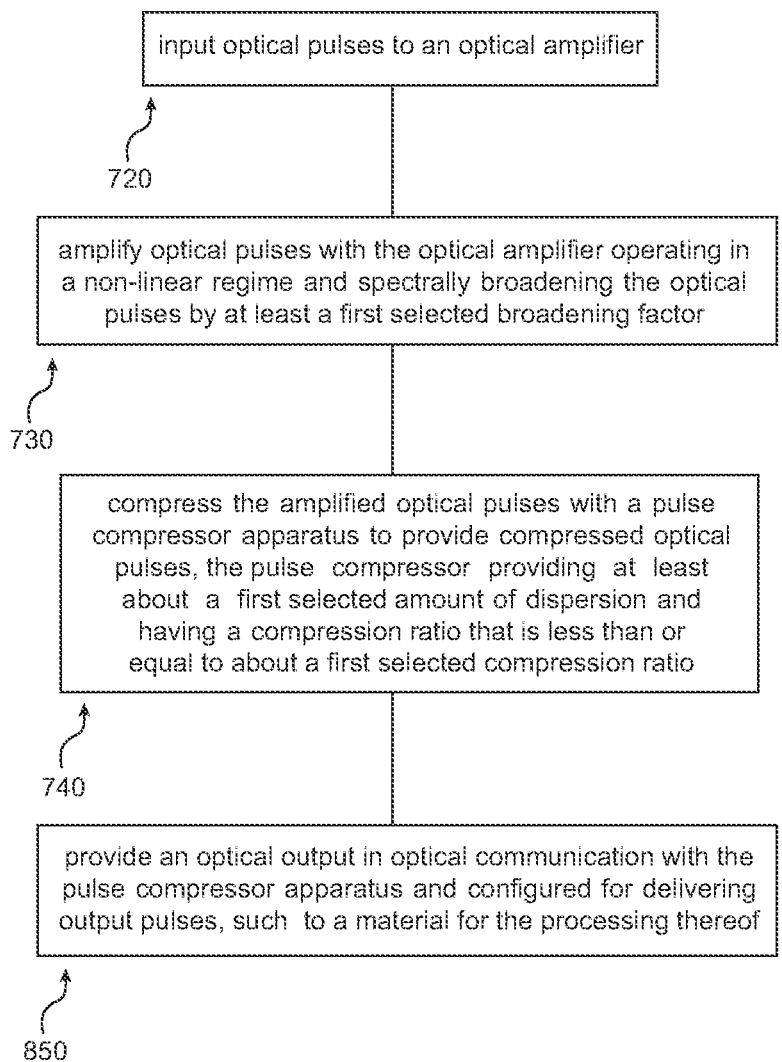
FIG. 9 is a flow chart schematically illustrating steps that can be included according to one method of the present disclosure for providing picoseconds laser pulses.

FIG. 9 is a chart schematically illustrating steps that can be followed in one practice of a method of the present disclosure. As indicated by reference numeral 720, the method can comprise inputting optical pulses to an optical amplifier. As indicated by reference numeral 730, the method can further comprise amplifying optical pulses with the optical amplifier operating in a nonlinear regime such that it spectrally broadens the optical pulses by at least a first selected broadening factor. Referring to reference numeral 740, the method can include compressing the optical pulses with a pulse compressor apparatus to provide compressed optical pulses, where the pulse compressor apparatus provides at least about a first amount of dispersion and has a compression ratio that is less than or equal to about a first selected compression ratio. Proceeding to consideration of reference numeral 750, the method can include providing an optical output in optical communication with the pulse compressor apparatus, where the optical output is configured for delivering optical output pulses, such as to a material for the processing thereof.

Figure 10:
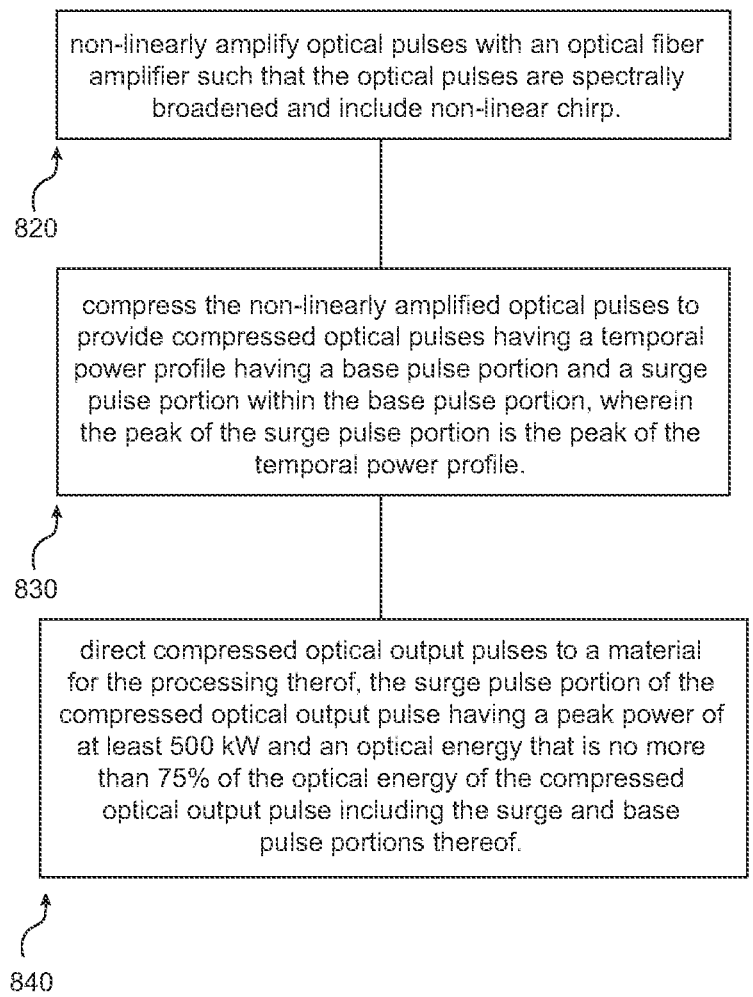
FIG. 10 is a flow chart schematically illustrating steps that can be included according to another method of the present disclosure for providing picoseconds laser pulses.

FIG. 10 is a chart schematically illustrating steps of another method that can be practiced in accordance with the present disclosure. As indicated by reference numeral 820, the method can comprise nonlinearly amplifying optical pulses with an optical fiber amplifier such that the optical pulses are spectrally broadened and include nonlinear chirp. With reference to reference numeral 830, the method can include compressing the nonlinearly amplified optical pulses to provide compressed optical pulses having a temporal power profile having a base pulse portion and a surge pulse portion within the base pulse portion, wherein the peak of the surge pulse portion is the peak of the temporal power profile. As indicated by reference numeral 840, the method can comprise directing compressed optical output pulses to a material for the processing thereof, where the surge pulse portion of the compressed optical output pulse has a peak power of at least 500 kW and an optical energy that is no more than 75% of the optical energy of the compressed optical output pulse including the surge and base pulse portions thereof.

The methods and apparatus described herein, such as the foregoing methods, can be practiced in accordance with the various aspects and practices of the disclosure herein. That is, for example, as the skilled artisan will readily appreciate from a reading of the present disclosure, the first selected compression ratio can be any of the compression ratios described herein (such as, for example, the compression ratios described above a latter portion of the Summary). Similarly, the first selected amount of dispersion can be any of the amounts of dispersion described herein in conjunction with compression or a compression apparatus (e.g., in the same paragraph with the compressions ratios described in the latter portion of the Summary), alone or in any combination with any of the disclosed compression ratios (as noted in the Summary). The foregoing consideration applies to the other parameters described herein, such as, for example, the spectral bandwidth of the input pulses, which, for example, can have any of the values noted in paragraph 30 above. By way of example, and not limitation, in one practice of the method, the input optical pulses can have a spectral bandwidth of less than or equal to 0.5 nm and/or a time duration of less than or equal to 40 ps. The first selected broadening factor can be, for example, 8, or 10, or 15, or 20.

As noted above, a pulsed fiber laser apparatus according to the present disclosure can include a spectral filter, such as the optional spectral filter 44 shown in FIGS. 1C-D. A spectral filter need not be optically downstream of the pulse compressor apparatus 28, as shown in FIGS. 1C-D, but can be incorporated elsewhere with the fiber laser apparatus 12C-D, such as, for example, with the pulse compressor apparatus 28. For example, the pulse compressor apparatus 300 shown in FIG. 4 can include the optional spectral filter 350. The pulse fiber laser apparatus can include a tunable spectral filter. For example, the spectral filter 350 can be tunable so as to provide a band (e.g., a stop band or pass band) that is tunable in bandwidth and/or center wavelength.

Spectral filtering before and/or after pulse compression can adjust the parameters of the surge pulse relative to the base pulse. For example, the spectral filter can be configured to filter out part or all of the aforementioned spectral wings shown in FIG. 6B. Because the wings represent nonlinear chirp, which in turn contributes to the formation of the base pulse portion, filtering out or otherwise modifying the wavelengths of the wings can affect the shape of the pulse by modifying the base portion relative to the surge portion. Generally speaking, a spectral filter can be optically located upstream or downstream of the pulse compressor apparatus and otherwise configured for changing, for example, the ratio of the temporal duration and/or the energy of the surge pulse portion to the overall temporal duration of the output pulse.

Figure 11:
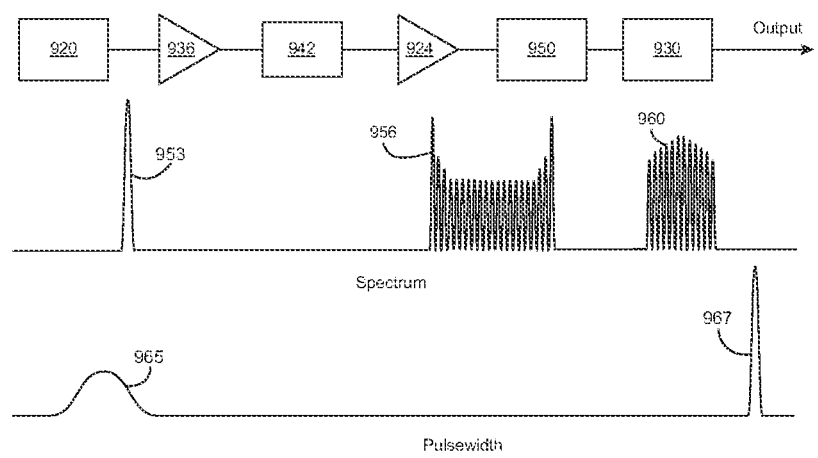
FIG. 11 schematically illustrates another embodiment of a pulsed laser according to the present disclosure.

FIG. 11 schematically illustrates another embodiment of a fiber laser according to the present disclosure, which can include a bulk optical amplifier. The embodiment of FIG. 11 includes a seed source, which can comprise the fiber delivered pulsed seed laser 920, a nonlinear amplifier 924, which can comprise a nonlinear fiber amplifier as described above (e.g., a described in conjunction with FIG. 2), a bulk optical amplifier 950, and a pulse compressor 930. Also shown in FIG. 11 are a pre amplifier 936 and pulse picker 942. As the skilled worker familiar with the present disclosure will readily appreciate, the embodiments shown in FIGS. 1A-D can also include a pulse picker and/or a preamplifier, and the embodiment of FIG. 11 an include a pulses stretcher, such as the pulse stretcher 40 as described in conjunction with the discussion of FIGS. 1B and D.

The bulk optical amplifier 950, which can comprise, for example, diode pumped solid state (DPSS) amplifier, can have a spectral bandwidth that is less than the spectral bandwidth of the nonlinearly amplified pulse, and can filter the pulse so as to, for example, remove in whole or in part the aforementioned spectral "wings". The filtering action of the bulk amplifier can result in pulse have a reduced or eliminated base portion, allowing some conditioning of the output pulse. Selection or control of the spectral bandwidth of the filter (e.g., a solid state amplifier having spectral bandwidth that is substantially narrower than that of the nonlinearly amplified pulse) can allow selection or control of the shape of the compressed, such as, for example, the relative time duration or energy content of the surge and base pulses, and hence of the surge pulse to the overall pulse.

FIG. 11 schematically illustrates the spectral power profiles 953, 956 and 960. Spectral power profiles 953 and 956 represent, respectively, pulse spectral power profiles before and after nonlinear amplification. Spectral power profile 960 represent the pulse spectral profile after spectral filtering, such as spectral filtering the bulk optical amplifier 950, thought more generally it can represent spectral filtering by any spectral filter, such as a dedicated spectral filter (i.e., a optical element that does not have a substantial function other than filtering) or, as another example, by a grating, such as a VBG or CVBG (e.g., a CVBG used for pulse compression) having a spectral bandwidth that is less than that of the optical pulse downstream of the nonlinear amplification process. Note that the filtered spectral power profile 960 does not include the "wings" at the outer most portions of the spectral power profile 956. In the example shown in FIG. 11, the spectral filtering process filters out substantially all of the spectrum that is responsible for base portion of the compressed pulse, such that both temporal power profiles 965 and 967, which schematically represent, respectively, temporal pulse profile before nonlinear amplification and after compression, represent "clean" pulses.

In various practices of the present disclosure a spectral filter, and hence the spectral filtering process of a method practiced in accordance with the teachings herein, has a spectral bandwidth that is at least 5%, at least 15%, at least 25%, or at least 35% or at least 45% less than that of the pulse received by filter, which received pulse will typically include spectral components added or enhanced during the nonlinear amplification. The percentage by which the spectral bandwidth is less can be determined by taking the difference between the spectral bandwidth of the received pulse and that of the spectral filter and dividing by the spectral bandwidth of the received pulse.

As the ordinarily skilled worker, apprised of the present disclosure, will appreciate, a spectral filtering process as described above in conjunction with FIG. 11, or in any other method or apparatus embodiment described herein, can be tunable such relative powers or temporal durations of the surge and base portions can be adjusted. For example, the bandwidth of the spectral filter can be tuned, and or the degree of suppression of particular wavelengths. In a variation of the embodiment shown in FIG. 11, spectrally filtering with a larger pass band can provide that the compressed pulse includes a base and surge pulse portions.

One of ordinary skill in the art will recognize, based on the disclosure herein, that in many instances structures alternative to those shown in the appended FIGURES can be used to achieve the benefits of the inventions disclosed herein.

Several embodiments of the invention have been described and illustrated herein. Those of ordinary skill in the art will readily envisage a variety of other means and structures for performing the functions and/or obtaining the results or advantages described herein and each of such variations or modifications is deemed to be within the scope of the present invention. More generally, those skilled in the art would readily appreciate that all parameters, dimensions, materials and configurations described herein are meant to be exemplary and that actual parameters, dimensions, materials and configurations will depend on specific applications for which the teaching of the present disclosure is used.

Those skilled in the art will recognize or be able to ascertain using no more than routine experimentation many equivalents to the specific embodiments of the invention described herein. It is therefore to be understood that the foregoing embodiments are presented by way of example only and that within the scope of the appended claims and equivalents thereto, the invention may be practiced otherwise than as specifically described. The present disclosure is directed to each individual feature, system, material and/or method described herein. In addition, any combination of two or more such features, systems, materials and/or methods, if such features, systems, materials and/or methods are not mutually inconsistent, is included within the scope of the present invention.

In the claims as well as in the specification above all transitional phrases such as "comprising," "including," "carrying," "having," "containing," "involving" and the like are understood to be open-ended. Only the transitional phrases "consisting of" and "consisting essentially of" shall be closed or semi-closed transitional phrases, respectively, as set forth in the U.S. Patent Office Manual of Patent Examining Procedure §2111.03, 7th Edition, Revision.

The phrase "A or B" as in "one of A or B" is generally meant to express the inclusive "or" function, meaning that all three of the possibilities of A, B or both A and B are included, unless the context clearly indicates that the exclusive "or" is appropriate (i.e., A and B are mutually exclusive and cannot be present at the same time). "At least one of A, B or C" (as well as "at least one of A, B and C") reads on any combination of one or more of A, B and C, including, for example the following: A; B; C; A & B; A & C; B & C; A & B; as well as on A, B & C.

It is generally well accepted in patent law that "a" means "at least one" or "one or more." Nevertheless, there are occasionally holdings to the contrary. For clarity, as used herein "a" and the like mean "at least one" or "one or more." The phrase "at least one" may at times be explicitly used to emphasize this point. Use of the phrase "at least one" in one claim recitation is not to be taken to mean that the absence of such a term in another recitation (e.g., simply using "a") is somehow more limiting. Furthermore, later reference to the term "at least one" as in "said at least one" should not be taken to introduce additional limitations absent express recitation of such limitations. For example, recitation that an apparatus includes "at least one widget" and subsequent recitation that "said at least one widget is colored red" does not mean that the claim requires all widgets of an apparatus that has more than one widget to be red. The claim shall read on an apparatus having one or more widgets provided simply that at least one of the widgets is colored red. Similarly, the recitation that "each of a plurality" of widgets is colored red shall also not mean that all widgets of an apparatus that has more than two red widgets must be red; plurality means two or more and the limitation reads on two or more widgets being red, regardless of whether a third is included that is not red, absent more limiting explicit language (e.g., a recitation to the effect that each and every widget of a plurality of widgets is red).

The invention claimed is:

1. Pulsed fiber laser apparatus for outputting picosecond laser pulses, comprising:
   a fiber delivered pulsed seed laser for providing picosecond optical seed pulses;
   at least one optical fiber amplifier in optical communication with said fiber delivered pulsed seed laser;
   said optical fiber amplifier comprising a gain optical fiber that receives and optically amplifies picosecond optical pulses by operating in a nonlinear regime wherein the picosecond optical pulses are spectrally broadened by a factor of at least 8 during amplification thereof;
   pulse compressor apparatus in optical communication with said optical fiber amplifier for providing compressed picosecond optical pulses; and
   wherein said pulse compressor apparatus provides a dispersion of at least 50 ps/nm and provides a compression ratio of the time duration of the picoseconds optical pulses received by the pulse compressor apparatus to the time duration of the compressed picosecond optical pulses of no greater than about 50.

2. The pulsed fiber laser apparatus of claim 1 wherein the picosecond optical pulses received by the gain optical fiber have a time duration that is at least about 20 ps.

3. The pulsed fiber laser apparatus of claim 1 wherein said picosecond optical seed pulses have a bandwidth of not greater than about 0.5 nm.

4. The pulsed fiber laser apparatus of claim 1 wherein said compressed picosecond optical pulses having a duration of no less than about 2 ps.

5. The pulsed fiber laser apparatus of claim 1 wherein the time duration of the picosecond optical pulses received by said gain optical fiber is substantially the same as the time duration of said picosecond optical seed pulses.

6. The pulsed fiber laser apparatus of claim 1 wherein said fiber delivered pulsed seed laser comprises a fiber-based master oscillator, said master oscillator being fiber based at least in that it comprises a laser cavity comprising a length of rare earth doped optical fiber.

7. The pulsed fiber laser apparatus of claim 6 wherein said laser cavity is mode locked.

8. The pulsed fiber laser apparatus of claim 1 wherein said gain optical fiber comprises a taper wherein the mode field diameter of the fundamental mode increases along a length of the optical gain fiber.

9. The pulsed fiber laser apparatus of claim 8 wherein said taper comprises a taper ratio of at least 1.5.

10. The pulsed fiber laser apparatus claim 1 wherein the gain optical fiber comprises a mode field diameter of the fundamental mode of less than about 25 microns for at least a location along the gain optical fiber.

11. The pulsed fiber laser apparatus of claim 1 wherein for any optical fiber amplifier optically upstream of said pulse compressor apparatus the mode field diameter of the fundamental mode does not exceed about 14 microns.

12. The pulsed fiber laser apparatus of claim 1 wherein said pulsed fiber laser apparatus does not comprise a fiber amplifier having a gain optical fiber that amplifies at a wavelength wherein the gain optical fiber is multimoded.

13. The pulsed fiber laser apparatus of claim 1 wherein said pulse compressor apparatus comprises at least one chirped volume Bragg grating (CVBG).

14. The pulsed fiber laser apparatus of claim 13 wherein said pulse compressor apparatus comprises first and second CVBGs configured and arranged such the first CVBG receives optical energy having a different polarization state than the optical energy received by the second CVBG.

15. The pulsed fiber laser apparatus of claim 1 wherein said pulse compressor apparatus provides a dispersion of at least about 100 ps/nm.

16. The pulsed fiber laser apparatus of claim 1 wherein said compression ratio is not greater than about 30.

17. The pulsed fiber laser apparatus of claim 1 where said pulse compressor apparatus provides a dispersion of at least about 150 ps/nm.

18. The pulsed fiber laser apparatus of claim 1 wherein the apparatus does not include any pulse stretching that increases the duration of a pulse by more than a factor of 20.

19. The pulsed fiber laser apparatus claim 1 comprising a pulse stretcher optically downstream of said fiber delivered pulsed seed laser for providing temporal stretching.

20. The pulsed fiber laser apparatus of claim 1 comprising a bulk optical amplifier located optically downstream of said optical fiber amplifier.

21. The pulsed fiber laser apparatus of claim 1 comprising a spectral filter located optically downstream of said optical fiber amplifier for spectrally filtering the spectrally broadened optical pulses.

22. The pulsed fiber laser apparatus of claim 21 comprising a bulk optical amplifier located optically downstream of said optical fiber amplifier, said spectral filter comprising said bulk optical amplifier.

23. The pulsed fiber laser apparatus of claim 1 comprising an optical output in optical communication with said pulse compressor apparatus and configured for delivering compressed picosecond optical output pulses for material processing, said compressed picosecond optical output pulses comprising a temporal power profile having a base pulse portion and a surge pulse portion within the base pulse portion, the peak power of the surge pulse portion being the peak power of the compressed picosecond optical output pulse, and wherein the surge pulse portion of said compressed picosecond optical output pulse comprises no more than about 75% of the total energy of said compressed picosecond optical output pulse.

24. A method of providing picosecond ("ps") pulsed laser pulses with a laser system including an optical fiber amplifier, comprising:
   inputting picosecond optical pulses to the optical fiber amplifier, the optical fiber amplifier having a length of gain providing optical fiber;
   amplifying the optical pulses with the gain providing optical fiber wherein the gain providing optical fiber operates in a nonlinear regime and spectrally broadens the optical pulses by at least a factor of 8;
   compressing optical pulses with a pulse compressor apparatus in optical communication with the optical fiber amplifier so as to provide picosecond compressed optical pulses, the pulse compressor providing a dispersion of at least about 50 ps/nm and a compression ratio of the time duration of the optical pulses received by the compressor apparatus to the time duration of the compressed picosecond optical pulses of no greater than about 50.

\* \* \* \* \*